US011019191B1

(12) United States Patent
Gorsica, IV et al.

(10) Patent No.: US 11,019,191 B1
(45) Date of Patent: May 25, 2021

(54) CLAIM A SHAREABLE DEVICE FOR PERSONALIZED INTERACTIVE SESSION

(71) Applicant: Motorola Mobility LLC, Chicago, IL (US)

(72) Inventors: John J. Gorsica, IV, Round Lake, IL (US); Rachid M. Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/730,242

(22) Filed: Dec. 30, 2019

(51) Int. Cl.
*H04W 12/42* (2021.01)
*H04M 1/72403* (2021.01)
*H04M 1/72454* (2021.01)

(52) U.S. Cl.
CPC ... *H04M 1/72403* (2021.01); *H04M 1/72454* (2021.01); *H04W 12/42* (2021.01)

(58) Field of Classification Search
CPC .......... H04M 1/72522; H04M 1/7256; H04M 1/72403; H04M 1/72454; H04W 12/00401; H04W 12/42
See application file for complete search history.

(56) References Cited

U.S. PATENT DOCUMENTS

| 9,497,202 | B1 | 11/2016 | Calo et al. |
| 9,524,631 | B1* | 12/2016 | Agrawal et al. |
| 9,858,559 | B2 | 1/2018 | Raleigh et al. |
| 2008/0118013 | A1 | 5/2008 | Vis et al. |
| 2009/0300744 | A1 | 12/2009 | Guo |
| 2010/0235881 | A1* | 9/2010 | Liu ..................... G06F 21/6218 726/3 |
| 2010/0274569 | A1 | 10/2010 | Reudink |
| 2011/0075191 | A1 | 3/2011 | Meunier et al. |
| 2011/0221568 | A1* | 9/2011 | Giobbi ................... G06F 21/32 340/5.82 |
| 2012/0019379 | A1 | 1/2012 | Ben Ayed |
| 2013/0079059 | A1* | 3/2013 | Huslak ................... G06Q 10/10 455/558 |
| 2013/0145457 | A1 | 6/2013 | Papakipos et al. |

(Continued)

OTHER PUBLICATIONS

"Facial Recognition—Axis Communications", Retrieved at: https://www.axis.com/en-us/solutions-by-application/facial-recognition—on Aug. 27, 2019, 2 pages.

(Continued)

*Primary Examiner* — Julio R Perez
(74) *Attorney, Agent, or Firm* — Fig. 1 Patents

(57) ABSTRACT

In aspects of shareable devices, a shareable device implements a device sharing module that can recognize a user intends to claim the shareable device for temporary use. For instance, the device sharing module can determine that multiple users are present within a distance threshold of the shareable device and identify one of the users as intending to claim the shareable device. The device sharing module can then authenticate the identified user to the shareable device, without requiring user input, to enable claiming of the shareable device. The shareable device can obtain personalized content associated with the identified user for use on the shareable device. The device sharing module can then establish an interactive session which enables the identified user to access the personalized content through applications and services available on the shareable device.

20 Claims, 10 Drawing Sheets

(56) References Cited

U.S. PATENT DOCUMENTS

| | | | |
|---|---|---|---|
| 2014/0037243 | A1 | 2/2014 | Lee et al. |
| 2015/0022439 | A1* | 1/2015 | Alameh |
| 2015/0077228 | A1* | 3/2015 | Dua .................. G06Q 20/3674 340/5.81 |
| 2015/0101025 | A1 | 4/2015 | Murata et al. |
| 2016/0308859 | A1* | 4/2016 | Barry ........................ G07C 9/22 |
| 2016/0292404 | A1 | 10/2016 | Tseng et al. |
| 2017/0156026 | A1 | 6/2017 | Reudink |
| 2017/0300678 | A1 | 10/2017 | Metke et al. |
| 2018/0091538 | A1 | 3/2018 | Narayanan et al. |
| 2018/0173403 | A1 | 6/2018 | Carbune et al. |
| 2019/0120088 | A1 | 4/2019 | Ostrom et al. |
| 2020/0327458 | A1 | 10/2020 | Dutt et al. |

OTHER PUBLICATIONS

"Dual SIM Switch Widget—Google Play App", Retrieved at: https://play.google.com/store/apps/details?id=rs.org.nopo.dualsimcontrol&hl=en_US—on. Aug. 27, 2019, 3 pages.

"Use a Chromebook as a guest—Chromebook Help", Retrieved at: https://support.google.com/chromebook/answer/1057090?hl=en—on Aug. 27, 2019, 3 pages.

"RSA SECURID Hardware Tokens—Security tokens for identity and access management", Retrieved at: https://www.rsa.com/en-us/products/rsa-securid-suite/rsa-securid-access/securid-hardware-tokens—on Aug. 27, 2019, 4 pages.

"Geofencing & GPS Tracking—AMTEL", Retrieved at: http://www.amtelnet.com/solutions/mobile-security/geofencing-gps-tracking/—on. Aug. 27, 2019, 8 pages.

"BioID Facial Recognition App with face login", Retrieved at: https://www.bioid.com/facial-recognition-app/—on Aug. 27, 2019, 8 pages.

Saluste,"Windows Welcome/Lock Screen, User Switching and Shutdown Options", Retrieved at: https://www.winhelp.us/windows-basics.html, Apr. 5, 2019, 8 pages.

"Final Office Action", U.S. Appl. No. 16/730,476, dated Aug. 27, 2020, 11 pages.

"Non-Final Office Action", U.S. Appl. No. 16/730,941, dated Jul. 30, 2020, 10 pages.

"Non-Final Office Action", U.S. Appl. No. 16/730,476, dated Jun. 18, 2020, 11 pages.

"Final Office Action", U.S. Appl. No. 16/730,941, dated Jan. 7, 2021, 11 pages.

"Non-Final Office Action", U.S. Appl. No. 16/730,476, dated Mar. 4, 2021, 12 pages.

* cited by examiner

CLAIM A SHAREABLE DEVICE FOR PERSONALIZED INTERACTIVE SESSION

BACKGROUND

Devices such as smart devices, mobile devices (e.g., cellular phones, tablet devices), consumer electronics, and the like can be implemented for use in a wide range of environments and for a variety of different applications. Typically, these types of devices are highly personalized to a user identity in order to facilitate use of the device by the device owner. Device owners may wish to restrict access to a device in order to maintain privacy and secure personal information. Alternatively, device owners may wish to share a device with a select number of trusted people. Conventional systems used for device sharing involve user input of login credentials in order to authorize a shared user and initiate a guest session with a device. Similarly, a shared user who initiates a guest session will manually logout of the guest session in order to secure access to his or her user information.

In some instances, a user may forget to logout of a guest session before leaving the device. As a result, the personal user information may remain on display for viewing and/or any other user may have access to the user's personal accounts and applications. Alternatively, conventional systems may automatically logout a user in response to a period of inactivity, which may frustrate users who wish to maintain a session and continue using a device. In other instances, a user may wish to leave the device for a short time period without conceding the device for use by another user. However, conventional systems are not designed to maintain a guest session for one user so that other users cannot access the device.

In some instances, a device owner may wish to make a device available for use by many users in an unsupervised environment. Typically, in this environment, a device will not authorize users due to the sheer volume of users and time constraints associated with manual logins and logouts. As a result, devices in these environments are not personalized to each user and usually provide the same general information or service to all users.

BRIEF DESCRIPTION OF THE DRAWINGS

Implementations of the techniques for shareable devices are described with reference to the following Figures. The same numbers may be used throughout to reference like features and components shown in the Figures.

DETAILED DESCRIPTION

Figure 1:
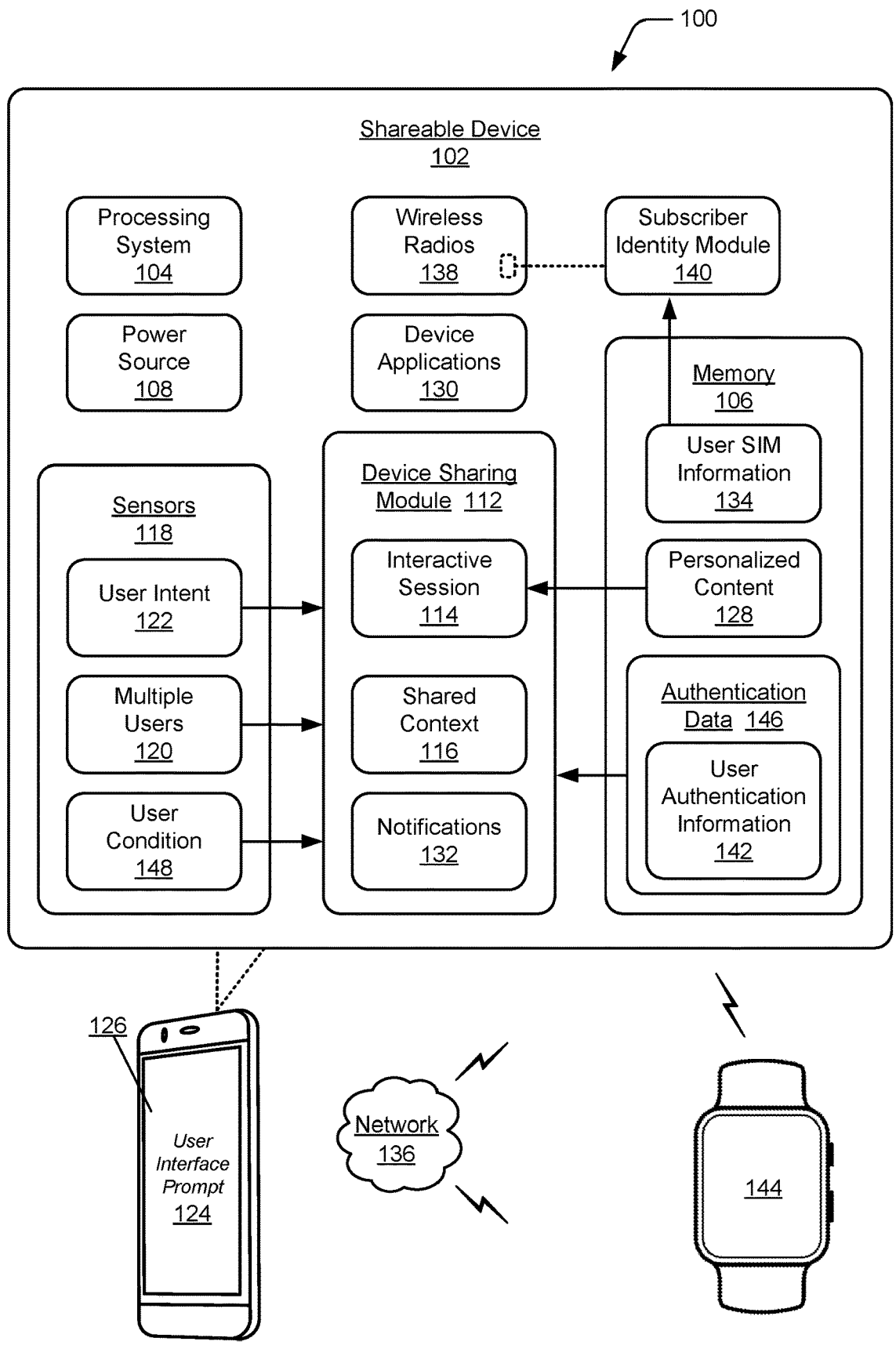
FIG. 1 illustrates an example device that can be used to implement techniques of shareable devices as described herein.

Implementations of shareable devices are described, and provide techniques for any user to claim and temporarily use a shareable device for a period of time. For example, a shareable device may be located in a shared setting and made accessible to multiple users. Rather than requiring a user to manually input login credentials on the device, the user may perform an action, such as a gesture or voice command, to indicate an intent to claim the shareable device for temporary use. Without requiring further input, the user can then be identified and authenticated to the shareable device to enable user access to use the shareable device.

In implementations, a shareable device may be a mobile phone, a tablet device, a smart television, or any other type of electronic, computing, and/or consumer device. For example, a shareable device may be a family television in a room of the house that is shared among family members, allowing each family member to access his or her own entertainment accounts in the context of personal viewing preferences. Similarly, a shareable device may be a tablet device that is shared among family members, or may be the mobile phone that any member of the family can "claim" and use on a temporary basis. For example, a family member may wish to access his or her email and social media accounts on the shareable device in a secure manner. These types of shareable devices between family members or friends are generally referred to as shareable devices in a private shared context.

Alternatively, a shareable device in a public shared context may be a computer, a tablet device, or other similar computing device in a doctor's office that is available to any member of the public, such as a patient who is waiting for an appointment. A person can "claim" and use the tablet device in the waiting room of the doctor's office on a temporary basis, such as to access his or her own personalized content through applications and/or services that are available on the shareable device as part of an interactive session that is initiated for the particular person. Conventional types of computer devices that may be shared by more than one user typically do not provide for seamless switching among users of the devices, and instead, require manual login and logout between users. Additionally, user interactions with conventional types of publicly available computer devices are limited to generic applications associated with a guest session, rather than providing a personalized interactive session in the context of personal viewing preferences for a particular user, as well as access to personal messaging and social media accounts via applications and services associated with the particular user.

In aspects of a shareable device claimed for a personalized interactive session, a shareable device implements a device sharing module that can recognize when a user intends to claim the shareable device for temporary use, such as detected by sensors of the device. For instance, the device sharing module can determine that multiple users are present within a distance threshold of the shareable device and identify one of the users as intending to claim the shareable device. The device sharing module can then authenticate the identified user to the shareable device, without requiring user manual input, to enable claiming of the shareable device. The device sharing module of the shareable device can receive user authentication information, which may be provided passively without user input and/or actively by the user manually inputting or otherwise providing a passcode unique to the user.

The device sharing module can also initiate the shareable device obtaining personalized content associated with the identified user for use on the device, such as based on profiles and accounts associated with the user that are activated when the user is determined to claim the shareable device. For example, the personalized content may be obtained by loading subscriber identity module (SIM) information of the user from a SIM profile associated with the user, and the SIM information enables network data communications for the particular user via the shareable device. Additionally, the device sharing module can obtain any type of personalized content associated with the user who has claimed the shareable device, such as incoming phone calls, text messages, emails, calendar updates, photo albums, social media, entertainment media, and/or emails, by accessing cloud services accounts associated with the user. The device sharing module can then establish an interactive session which enables the identified user to access the personalized content through applications and/or services available on the shareable device. The interactive session exposes the personalized content and the notifications that are associated exclusively with the particular user while the user has claim to the shareable device for temporary use.

Implementations of shareable devices as described herein also provide techniques that allow a user to end an interactive session that is associated with a user of the shareable device, such as based on user intent that is detected or determined to end the personalized interactive session. For example, a user may forget to logout of an interactive session on the shareable device before leaving the device or being called away, in which case his or her personal content and information may still be accessible by the next person that picks up the device. A user may walk away from a guest interactive session on a public shared device and inadvertently leave secure user information on display for the next user. In other instances, users may prematurely end the interactive guest session of another user who has walked away from the shareable device, but who intended to return or is currently running an application on the device, such as streaming music for playback while the user is some distance away from the device.

In aspects of a shareable device interactive session being ended or shared based on user intent, a shareable device implements the device sharing module that can maintain an interactive session of a user on the shareable device. The shareable device can detect that the user has moved away from the shareable device during the interactive session, and the device sharing module initiates to obscure personalized content associated with the user who has moved away from the device. Obfuscation of the personalized content prevents the display and/or viewing of the personalized content during the interactive session that is associated with the user on the shareable device to provide additional security of the content. The device sharing module can also detect, without user input, a user condition indicative of an intent to end or share the interactive session. For example, the device sharing module can maintain the interactive session for the user based on whether the shareable device is intended for shareable use in a private shared context or a public shared context.

The device sharing module can also maintain the interactive session for the user if a share mode is activated, which enables a different person or user to use the shareable device along with the user who has claimed the shareable device for temporary use. The device sharing module can determine whether the user is within a threshold distance proximate the shareable device, and if the user is not, the device sharing module can then determine whether an application associated with the interactive session of the user is being executed on the shareable device. The device sharing module can determine whether a device application is currently being used by the user or is performing a background task on the shareable device, or whether the device applications are inactive. The device sharing module can use both the detected user condition and the determined status of device applications to determine whether or not to maintain the interactive session for the user on the shareable device. The device sharing module can then end or share the interactive session based on the detected user condition and the determined status of the device applications.

In other aspects, the device sharing module of the shareable device can detect that the shareable device has been passed from the current user of the device to a new, additional user during the interactive session that is associated with the current user. The device sharing module can then determine or otherwise identify the intent of the current user when passing the shareable device to the additional user, such as based on the personalized content that is being displayed on the shareable device. For example, the current user may be using a mobile phone as the shareable device to display a digital photo album, and the user may pass the device, allowing another person to also view the digital images in the photo album. The device sharing module may determine that the photo album is the type of content likely to be shared among users and/or the device sharing module may identify the user intent to share the device based on a user input. The device sharing module implemented by the shareable device can identify the user intent to activate a share mode of the device. The device sharing module may also identify the alternate intent of the user to end the interactive session on the device based on user input and/or other factors used to identify an intent to end the interactive session, such as based on the type of the personalized content being displayed on the shareable device.

Implementations of shareable devices as described herein also provide techniques to deter theft of shareable devices, particularly shareable devices that are provided in a public shared context. Shareable devices that are publicly available and accessible to all users are susceptible to theft, and the owner of a shareable device may not be able to identify the last user or recover a stolen device without first obtaining user identifiable information about a user of the device. Conventional types of computer devices that may be shared by more than one user are limited in their ability to balance security and ease of use.

In aspects of restricting use and deterring theft of shareable devices, a shareable device can request and maintain user identifiable information that is usable to identify users of the shareable device for subsequent reference. The device sharing module implemented by the shareable device can initiate to request and receive the user identifiable information about a user who indicates an intent to use the shareable device. The user identifiable information may include a captured digital image of the user, a video clip of the user, a voice sample of the user, a device context that is personal to the user (such as at home), user credentials associated with a wearable device of the user, a credit card scan, a driver's license scan, and/or any other kind of information that is usable to identify the user. The device sharing module can then initiate an interactive session allowing the user to access the shareable device in response to receiving the identifiable information about the user.

The device sharing module can also initiate the shareable device communicating the user identifiable information to an additional device (e.g., a control device) that maintains the identifiable information for subsequent reference. The additional device can also maintain user access history that correlates with the user identifiable information associated with dates and times that various users have claimed use of the shareable device. The device sharing module can also initiate the shareable device communicating the location of the device to the additional device to identify the current location of the device, or at least the last known location of the shareable device. Thus, if the shareable device is lost or stolen, the owner of the shareable device may reference the shareable device location to determine where to find the device, or at least where to start looking for the device.

The device sharing module implemented by the shareable device can receive a disable command that is communicated from the additional device (e.g., as the control device) to the shareable device to disable the interactive session on the shareable device. If the shareable device is lost or stolen, or detected as no longer being connected to a network access point of a local area network, the owner of the shareable device can initiate a disable command at the control device, and the disable command is communicated to end the interactive session on the shareable device and/or disable the shareable device. Alternatively or in addition, the device sharing module implemented by the shareable device can receive an alarm command that is communicated from the additional device (e.g., as the control device) to the shareable device, causing the shareable device to emit an audible alarm, which may be useful to assist in locating the shareable device.

While features and concepts of shareable devices can be implemented in any number of different devices, systems, environments, and/or configurations, implementations of shareable devices are described in the context of the following example devices, systems, and methods.

Claim a Shareable Device for Personalized Interactive Session

FIG. 1 illustrates an example 100 of a shareable device 102 that can be used to implement techniques of the shareable devices, as described herein. In this example 100, the shareable device 102 may be any type of a computing device, tablet device, mobile phone, flip phone, smart watch, a companion device that may be paired with other mobile devices, and/or any other type of mobile device. Generally, the shareable device 102 may be any type of an electronic and/or computing device implemented with various components, such as a processing system 104 and memory 106, as well as any number and combination of different components as further described with reference to the example device shown in FIG. 10. For example, the shareable device 102 can include a power source 108 to power the device, such as a rechargeable battery and/or any other type of active or passive power source that may be implemented in an electronic and/or computing device.

In implementations, the shareable device 102 may be a mobile phone 110 (also commonly referred to as a "smartphone") or a tablet device that any user can claim and temporarily use for a period of time. For example, the shareable device 102 may be a family television in a room of the house that is shared among family members. A user may wish to access his or her own entertainment accounts in the context of personal viewing preferences. Similarly, the shareable device 102 may be a tablet device that is shared among family members, or may be the mobile phone 110 that any member of the family can "claim" and use on a temporary basis. For example, a family member may wish to access his or her email and social media accounts on the shareable device 102 in a secure manner. These types of shareable devices between family members or friends are generally referred to as shareable devices in a private shared context. Alternatively, a shareable device 102 in a public shared context may be a tablet or other similar computing device in a doctor's office that is available to any member of the public who is a patient waiting for an appointment. A person can "claim" and use the tablet device in the waiting room of the doctor's office on a temporary basis, such as to access his or her own personalized content through applications and/or services that are available on the shareable device as part of an interactive session that is initiated for the particular person.

In this example 100, the shareable device 102 includes a device sharing module 112 that implements features of shareable devices, as described herein. The device sharing module 112 may be implemented as a module that includes independent processing, memory, and logic components functioning as a computing and/or electronic device integrated with the shareable device 102. Alternatively or in addition, the device sharing module 112 can be implemented as a software application or software module, such as with the operating system and as computer-executable software instructions that are executable with a processor (e.g., with the processing system 104) of the shareable device 102. As a software application or module, the device sharing module 112 can be stored on computer-readable storage memory (e.g., the memory 106 of the device), or any other suitable memory device or electronic data storage implemented with the device sharing module. Alternatively or in addition, the device sharing module 112 may be implemented in firmware and/or at least partially in computer hardware. For example, at least part of the device sharing module may be executable by a computer processor, and/or at least part of the invention module may be implemented in a hardware circuit.

In aspects of shareable devices as described herein, the device sharing module 112 is implemented to allow a user to temporarily claim a shareable device 102 and establish a personalized interactive session 114 associated with a shared context 116 of the shareable device. As indicated above, the shared context 116 of the shareable device 102 may be a private shared context for the types of shareable devices that can be claimed, used, and shared between family members, friends, or co-workers. Alternatively, the shared context 116 of the shareable device 102 may be a public shared context for the types of shareable devices that can be claimed, used, and shared by generally any member of the public. Additionally, the shared context 116 may be determined based on the number of users present around or proximate the shareable device 102, the identity of users who are present, the type of shareable device, the location of the shareable device, user-specified settings, and/or any other contextual or setting-based factors. If the device sharing module 112 determines that the shareable device 102 is in a private shared context, claiming of the shareable device 102 may be triggered by the presence of a user and be performed automatically. Alternatively, if the device sharing module 112 determines that the shareable device 102 is in a public shared context, the device sharing module of the shareable device may first determine an intentional user action to claim the device.

In some implementations, the shared context 116 of the shareable device 102 is based on the number of users who are present in proximity of the shareable device, such as detected by sensors 118 of the device. For example, a private shared context may correspond to only one user being in proximity of the shareable device 102, whereas a public shared context may correspond to multiple people being in proximity of the shareable device. As described in the examples above, a private shared context of the shareable device 102 may be associated with a tablet device or the mobile phone 110 that is shared among family members, and any member of the family can claim and use the device on a temporary basis. If the device sharing module 112 determines that there is only one person in the room where the device is located, or in proximity of the device, such as based on input from the sensors 118, then the device sharing module 112 can automatically authenticate the person as a user of the shareable device 102 and obtain personalized content associated with the user, even before the user provides user intent to claim the device.

In another example, a public shared context of the shareable device 102 may be associated with a tablet device or other computing device in a public location or office that is generally available to any member of the public to claim and use the device on a temporary basis. If the device sharing module 112 determines multiple people (who may also be multiple users 120) in proximity of the device, such as based on input from the sensors 118, then the device sharing module 112 can wait to receive and determine an intentional user action that indicates user intent 122 to claim and use the shareable device 102, such as a user action in the form of a voice command, detecting a person approaching or reaching for the device, and/or a person picking up the device. The presence of multiple devices and privacy assessments can also be determined by a claimable device sniffing their Wi-Fi or Bluetooth™ signals and expected range based on RSSI (received signal strength indication) levels.

In implementations, the device sharing module 112 is implemented to recognize that a user intends to claim the shareable device 102 for temporary use. The user intent 122 may be recognized as detected by one or more of the device sensors 118, such as based on a user gesture, an audible input, a user biometric input, user lip-tracking, user proximity to the shareable device, the gaze direction of a user, shareable device movement, shareable device orientation, user input via a user interface of the device (e.g., as a user passcode, a user PIN, selection of a displayed selectable control, a user identifiable beacon, etc.), and/or any other indication of the user intent 122 to claim and temporarily use the device. The time of day when a user action is detected can also influence device shareability, such as at midnight when a shareable device may limit the sharing for some device applications. For example, the device sharing module 112 can recognize and/or determine user intent 122 to claim the shareable device 102 based on the user being detected within a distance threshold proximate the shareable device. A gesture input may include the user waving at the shareable device, pointing at the device, turning to face the shareable device, or any other gesture capable of being detected by the sensors 118. Similarly, an audible input from the user may include voice commands, clapping hands, snapping fingers, or any other audible input capable of being detected by the sensors 118.

In response to the device sharing module 112 recognizing and/or determining the user intent 122 to claim use of the shareable device 102, the device sharing module 112 can initiate displaying a user interface prompt 124 to prompt a user to confirm that he or she intends to claim the shareable device 102 for temporary use. For example, the mobile phone 110, as an example of the shareable device 102, includes a display screen 126 on which the user interface prompt 124 can be displayed in a user interface, and via which a user response can be received. For example, the user may respond to the user interface prompt 124 by way of a manual user input entered on the display screen 126.

In some embodiments, the sensors 118 can include hardware sensors that gather data used to recognize the user intent 122, such as, by way of example and not of limitation, a camera for facial and gesture recognition, a microphone, a fingerprint sensor to identify fingerprints, an eye and/or lip tracking sensor, a gyroscope, an accelerometer, a detected beacon, and/or any other types of motion sensors to sense motion and orientation of the shareable device 102. While described in the context of hardware sensors, it is to be appreciated that the sensors 118 may also include software, firmware, hardware, or any combination thereof.

In implementations in which the multiple users 120 are detected by the sensors 118 as being present in proximity of a shareable device 102, the device sharing module 112 is implemented to identify that one of the users intends to claim the shareable device for temporary use. The user who is determined to have the user intent 122 to claim the shareable device 102 can be identified based on the respective distances of the multiple users 120 from the location of the shareable device, based on a distance threshold proximate the shareable device, and/or based on a gesture or user input indicative of intent to claim the shareable device 102 as described in detail above. For example, the shareable device 102 may be a mobile phone attached to a surface in a public location, such as in an airport. In one implementation, the device sharing module 112 may use a distance threshold to define a region around the mobile phone. If only one user is within the defined region, the device sharing module can identify the user as having the user intent 122 to claim the mobile phone for temporary use.

Alternatively, the device sharing module 112 may determine relative locations of multiple users and identify the user with a location closest to the mobile phone. In another implementation, the identification of a user with intent to claim the shareable device 102 may be based on detection of a user gesture, such as pointing at the mobile phone, or a gesture to pick up the mobile phone triggering touchless authentication. In the event that multiple users express user intent 122 to claim the mobile phone at the same time, the device sharing module 112 can implement a variety of techniques to prioritize users, such as a status associated with user identities and/or a first-come-first-served basis in which the user who has been in proximity of the shareable device for a longer period of time has priority.

In the context of claiming and temporarily using the shareable device 102, an interactive session 114 can be initiated and/or established for a user who wants to access and interact with his or her own accounts, applications, personal information, and/or services that are associated with the user. For example, the user may wish to access an email account and/or social media accounts on or from the shareable device 102 in a secure manner. In implementations, the device sharing module 112 can establish the interactive session 114, which enables the user to access personalized content 128 of the user via device applications 130 and/or services available on or through the shareable device 102. The device applications 130 may include applications and user interfaces for text messaging, cellular phone calls, email communications, gaming, social media, music playback, entertainment services, and/or any other type of device applications 130 that execute on the shareable device. In implementations, the device sharing module 112 can request login credentials from the user as an additional security step in order to establish the interactive session 114 for the user on the shareable device 102, and prior to the user gaining access to the personalized content 128 on or from the shareable device.

The personalized content 128 may also include notifications 132 that accompany the personalized content 128, which is associated with the user (such as indications of incoming phone calls, text messages, emails, and/or calendar updates, etc.). The notifications 132 may also include push notifications associated with operation of the shareable device 102. Notably, the interactive session 114 exposes the personalized content 128 and the notifications 132 that are associated exclusively with the particular user while the user has claim to the shareable device 102. The device sharing module 112 is also designed to exclude any personalized content and/or notifications that may be associated with a previous user of the shareable device 102.

The device sharing module 112 is implemented to obtain the personalized content 128 that is associated with a user for use on the shareable device 102 that has been claimed by the user. The device sharing module 112 may obtain the personalized content 128 that is associated with a particular user based in part on the determination of the shared context 116 in which the shareable device 102 is being claimed for temporary use. The personalized content 128 can also be obtained based on profiles and accounts associated with the user that are activated when the user is determined to claim the shareable device 102. For example, the personalized content 128 may be obtained by loading subscriber identity module (SIM) information 134 of the user from a SIM profile associated with the user. This SIM information 134 can enable network data communications for the particular user via the shareable device 102. Further, an eSIM module can store multiple profiles, such as for different users of the shareable device. Additionally, the device sharing module 112 may obtain any type of the personalized content 128 associated with the user who has claimed the shareable device, such as incoming phone calls, text messages, emails, calendar updates, photo albums, social media, entertainment media, and/or emails, by accessing cloud services accounts associated with the user.

In implementations, the shareable device 102 can communicate with other devices and the cloud-based services via a network 136 (e.g., LTE, WLAN, etc.) or via a direct peer-to-peer connection (e.g., Wi-Fi Direct, Bluetooth™, Bluetooth LE (BLE), RFID, NFC, etc.). The shareable device 102 can include wireless radios 138 that facilitate wireless communications, as well as communication interfaces that facilitate network communications. The shareable device 102 can be implemented for data communication between devices and network systems via the network 136, which can be represented or otherwise implemented as a combination of two or more networks. The network 136 may include wired and/or wireless networks implemented using any type of network topology and/or communication protocol, to include IP-based networks, and/or the Internet, as well as networks that are managed by mobile network operators, such as a communication service providers, mobile phone providers, and/or Internet service providers.

The shareable device 102 also includes a subscriber identity module 140 (SIM, or commonly referred to as a SIM card) or an embedded SIM (eSIM) designed to securely store the user SIM information 134 for the user who has claimed the shareable device 102 for temporary use. An eSIM module can store multiple profiles, such as for different users of the shareable device. The user SIM information 134 may include an international mobile subscriber identity (IMSI) number and related security key associated with the user of the shareable device. For example, the SIM 140 is used to identify and authenticate the device as a subscriber on a cellular network, and enables a subscription with a wireless network operator for wireless communication by the shareable device 102 using communication networks associated with the wireless network operator. The claimability of the shareable device can offer multiple levels of access, such as for kids, adults, family, and the like.

The device sharing module 112 can also authenticate an identified user to the shareable device 102 to enable claiming of the shareable device 102 for temporary use by the user. In implementations, the device sharing module 112 can receive, such as via a communication interface, the wireless radios 138, or the sensors 118, user authentication information 142, which may be provided passively without user input and/or actively by the user manually inputting or otherwise providing a passcode unique to the user. The user authentication information 142, which may be obtained passively, can include biometrics, such as a face ID, a touch ID, and/or by voice recognition. In some implementations, the user authentication information 142 may be received from a wearable device 144 that can communicate the user authentication information 142 via the network 136 to the shareable device 102. For example the wearable device 144 may be a smartwatch or other device that collects unique user biometrics which can be used to authenticate a user to the shareable device 102 to enable the user claiming the device for temporary use. The user authentication information 142 collected from the user and/or from another device may be compared to authentication data 146 that is stored in memory 106 or in a cloud database. The authentication data 146 may include existing account credentials that are associated with an identity of the user, such as for previous users of the device whose authentication data is stored on the device for subsequent use by a returning user.

As described above, user authentication by the device sharing module 112 can be performed using the existing authentication data 146 and/or using the obtained user authentication information 142 to authenticate a user identity and enable the user claiming of the shareable device 102 for temporary use. In implementations, the claiming of the shareable device 102 can include the device sharing module 112 of the shareable device logging out a previous user, activating a SIM profile associated with the user who is claiming the device for use, enabling connections between the shareable device 102 and the cloud services associated with the user, and logging into accounts associated with the user. Notably, the features of claiming the shareable device 102 as managed by the device sharing module 112 makes the shareable device available for use by only the authenticated user and restricts access and use of the device by other users.

End a Shareable Device Interactive Session Based on User Intent

In aspects of shareable devices, the device sharing module 112 is also implemented to allow a user to end an interactive session 114 that is associated with a user of the shareable device 102, such as based on user intent 122 to end the personalized interactive session. For example, a user may forget to logout of an interactive session 114 on the shareable device 102 before leaving the device or being called away, in which case his or her personal content 128 and information may still be accessible by the next person that picks up the device. In implementations, the device sharing module 112 can detect, using the sensors 118, that a user has moved away from the shareable device 102 after an interactive session 114 has been established for the user on the shareable device 102. The sensors 118 may be configured as motion sensors, thermal sensors, cameras, face detectors, depth sensors, sound sensors, and/or presence sensors to identify whether a user has moved away from the shareable device, as well as how far away the user is from the device. In implementations, the device sharing module 112 can maintain the interactive session 114 for the user on the shareable device 102, while also obscuring the personalized content 128 of the user. In some implementations, the device sharing module 112 may detect that the user is within a threshold distance proximate the shareable device 102, and in response, display the previously obscured personalized content 128 so that the user can continue the interactive session 114 on the shareable device.

In other implementations, the device sharing module 112 can detect, such as by using the sensors 118, a user condition 148 indicative of an intent to end the interactive session 114 on the shareable device 102. The user condition 148 may be detected as the user moving away from the shareable device for more than a designated time duration, the user moving more than a designated distance away from the shareable device, or a combination thereof. Detection of the user condition 148 can be performed automatically by the device sharing module 112, without a manual user input from the user who is associated with the current interactive session 114 on the device.

The device sharing module 112 is also implemented to determine a status of a device application 130 that is being executed on the shareable device 102 during the interactive session 114 for the user. An application status can include any indication of an active status, such as device applications 130 that are currently being used by the user or are performing a background task on the shareable device, or an inactive status that indicates device applications 130 that are not in use and/or are not performing a background task. The device sharing module 112 can end the interactive session 114 in response to determining that the status of a device application 130 has changed from active to inactive. For example, a user may have an audio streaming application playing a podcast on the shareable device 102. During audio playback of the podcast, the device sharing module 112 may determine that the application status of the audio streaming application is active, and in response, maintain the interactive session 114 for the duration of the podcast. Once the podcast has ended and the audio streaming application is no longer executing playback, the device sharing module 112 may determine that the application status of the audio streaming application is inactive. In response to determining that the status of the application has changed from active to inactive, the device sharing module 112 can then end the interactive session 114 of the user, so that the device is available for another user.

The device sharing module 112 is also implemented to end an interactive session 114 of a user of the shareable device 102 on behalf of the user. The device sharing module 112 may end an interactive session 114 based on the detected user condition 148 and/or based on the determined status of the device applications 130. The device sharing module 112 ending an interactive session 114 can include logging-out the current user, as well as removal of the personalized content 128 that associated with the current user for the interactive session. When the device sharing module 112 ends the interactive session 114, the shareable device 102 becomes available for a new user to claim and temporarily use the device.

As noted above, the device sharing module 112 can maintain or end the interactive session 114 of a user in response to a combination of a user condition 148 and an application status of a device application 130. For example, a user may interact with a gaming application on a shareable device 102, such as a television. The user may move away from the television and the device sharing module 112 can detect that the user has moved away and is no longer within a distance threshold proximate to the shareable device. Voice interpretation can also be used to determine the user leaving the device. The device sharing module 112 may also determine that the status of the gaming application is active and track the amount of time that passes while the user is outside of the device proximity threshold. In response, the device sharing module 112 can then obscure the personalized content 128 of the user, but also maintain the interactive session 114 for the user.

If the user returns to within the proximity threshold of the television, the device sharing module 112 can maintain the interactive session 114 for the active gaming application that was executing for less than a defined time threshold. Additionally, the device sharing module 112 can then re-display the personalized content 128 (e.g., the active gaming session) for the user on the television device when the user is detected to be within the distance threshold proximate the television. Alternatively, the user may not return to use the shareable device 102 for an extended period of time, effectively preventing another family member from using the shareable television. The device sharing module 112 can determine that the active gaming application has been executing for more than a defined time threshold. The device sharing module 112 can then end the interactive session 114 of the user based on both the user condition 148 of not being within the proximity threshold of the device and the application status being indicative of an intent to end the interactive session.

In other implementations, the device sharing module 112 can end an interactive session 114 based on a determination of the shared context 116 of the device. If the device sharing module 112 determines a public shared context of the shareable device, the device sharing module may end the interactive session 114 based on more restrictive conditions, such as an application status being inactive for a shorter time period, or a distance proximity threshold that is closer to the shareable device, in order to more effectively secure personalized content. If the device sharing module 112 determines a private shared context of the shareable device 102, the criteria to end the interactive session 114 may not be as stringent based on the user condition 148 and application status before the device sharing module 112 ends the interactive session 114. For example, the device sharing module 112 may end the interactive session 114 on a tablet device that is provided as the shareable device 102 in a public shared context in response to the current user of the device moving more than two feet away from the tablet device. By contrast, the device sharing module 112 can maintain the interactive session 114 on a tablet device that is provided as the shareable device 102 in a private shared context, such as in a restricted-access laboratory, as the user moves around the lab space, and only then end the interactive session 114 in response to the user leaving the laboratory.

Additionally, the device sharing module 112 can activate a share mode that enables an additional user to use the shareable device along with a current user who has claimed the shareable device 102. Once activated in the share mode, the device sharing module 112 can maintain the interactive session 114 for the current user who has claimed the device, and also allow the additional user to also participate in the interactive session 114. The device sharing module 112 can detect, such as by using the sensors 118, that the shareable device 102 has passed from the current user of the shareable device 102 to a new, additional user during the interactive session 114 that is associated with the current user. In implementations, the sensors 118 may include one or more motion sensors that indicate the shareable device 102 was not put down during handoff from the current user to the additional user, and from which the device sharing module 112 can determine that the user of the shareable device intends to share the device with the additional user.

The device sharing module 112 is implemented to identify the intent of the current user when passing the shareable device 102 to the additional user, such as based on the personalized content 128 that is being displayed on the shareable device. For example, the current user may be using the mobile phone 110 as the shareable device to display a digital photo album, and the user may pass the device to another person, allowing the other person to also view the digital images in the photo album. The device sharing module 112 may determine that the photo album is personalized content 128 of the current user, and is the type of content likely to be shared among users. Alternatively or in addition, the device sharing module 112 may identify user intent of using the shareable device 102 based on a user input. The user input, such as detected using the sensors 118 or via a user interface on the display screen 126, may include a user gesture, an audible input, a user biometric input, user lip-tracking, detected user proximity to the shareable device, shareable device movement, shareable device orientation, a user pass code, a user PIN, and/or selection of a selectable control displayed on the user interface. For example, a user of the mobile phone 110 may select a share mode option displayed in a user interface on the display screen 126 prior to handing the mobile phone to another person. Similarly, a user of a shareable gaming system may point at the new, additional person and gesture a 'thumbs-up' to indicate intent to share the gaming system with the other person. In another example, the device sharing module 112 may identify an audible input and device orientation in combination, such as a user stating "Watch this video!" and then rotating the mobile phone 110 to a horizontal display, as indicative of intent to share the device.

In another example of initiating a share mode of the shareable device 102, the device sharing module 112 may identify a user intent 122 to share the device being passed to another person based on facial detection and/or recognition, or proximate multiple speech interpretation. For example, the device sharing module 112 may detect and recognize the face of the current user during the interactive session 114. When the user then passes the shareable device 102 to another person, and multiple faces are detected, the device sharing module 112 can determine that at least one of the detected faces is recognized as the user, and the device sharing module 112 can identify the intent of the user to activate a share mode of the shareable device. The share mode enables the additional person (or a new user) to participate in the interactive session 114 of the current user on the shareable device with the permission of the user. The described examples of determining user intent to share a device are not limiting, and a variety of other factors may be used to supplement a determination of the user intent to share the device, including the user condition 148, the type of shared context 116, a device application status, and/or based on the authentication data 146.

In alternate implementations, the device sharing module 112 may identify the shareable device 102 being passed to another person (or a new user) as intent of the current user to end the interactive session 114 of the current user on the shareable device. This intent to end the interactive session 114 of the current user may be identified based on the same factors used to identify an intent to share the shareable device 102, as described in detail above. For example, a user may pass the mobile phone 110 to a new user and may gesture as if to wave "goodbye" to the shareable device, indicating the intent to end the interactive session. In this implementation, the device sharing module 112 ends the interactive session 114 of the current user on the shareable device 102, which may include logging-out the current user from the device, as well as removal of the personalized content 128 that is associated with the interactive session 114 of the user. Additionally, the device sharing module 112 may trigger an authentication and login of the new user of the shareable device 102, where the login of the new user may be performed automatically and without user input from the new user.

Shareable Device Use Based on User Identifiable Information

Figure 2:
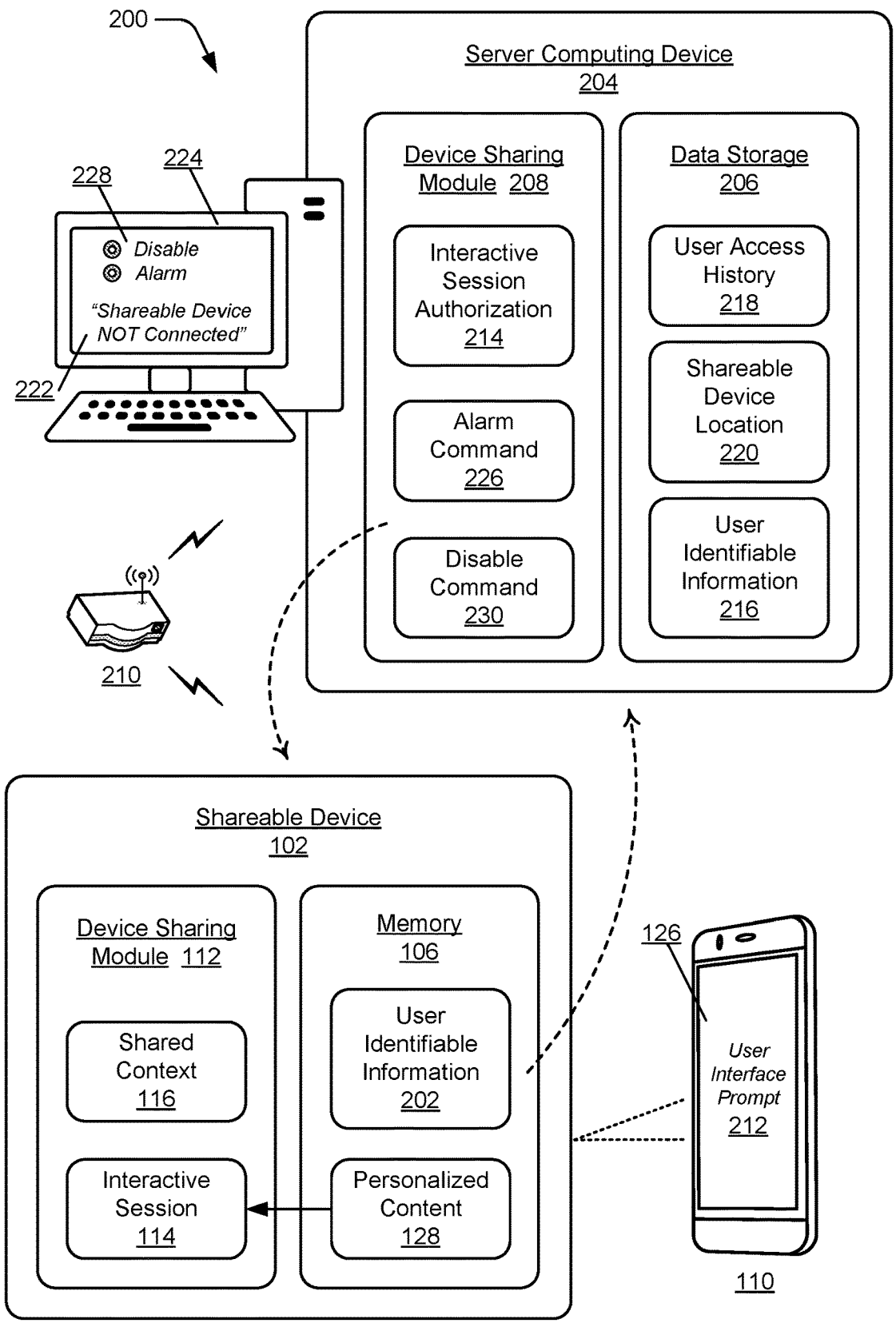
FIG. 2 illustrates an example system in which aspects of shareable devices can be implemented.

FIG. 2 illustrates an example system 200 in which aspects of shareable devices can be implemented, as described herein. This example system 200 includes the mobile phone 110 as an example of the shareable device 102 that is shown and described with reference to FIG. 1. The mobile phone 110 is a shareable device that implements the device sharing module 112 in a shared context 116, and can establish the interactive session 114 for a user, which allows the user to access his or her own entertainment accounts in the context of personal viewing preferences and/or access his or her email and social media accounts in a secure manner, generally as the personalized content 128 that is associated with the user. In implementations, the device sharing module 112 can also request or obtain user identifiable information 202 about the user, which can be stored in memory 106 on the device. The user identifiable information 202 can include any information from which the identity of the user can be determined, such as a photo of the user, or a scan of the user's driver's license. Notably, the user identifiable information 202 can include any type of images of the user that the owner of the shareable device 102 can use to identify the user at a later time. Alternatively or in addition, the user identifiable information 202 may be information or data that a computing device can utilize to identify the user.

This example system 200 also includes a server computing device 204 that has data storage 206 and can implement an instantiation of the device sharing module 208. In implementations, the server computing device 204 is a control device that can control aspects of sharing the shareable device 102 (e.g., the mobile phone 110) in the various shared context 116 of the device. The server computing device 204 and the shareable device 102 can be communicatively connected via an access point 210 that wirelessly connects the devices for network communication, such as in a local area network. Generally, the access point 210 may be part of the network 136 as shown and described with reference to FIG. 1 that facilitates data communications between the devices.

The server computing device 204 is representative of one or more hardware server devices (e.g., computing devices) that may be implemented at the network system and/or in a cloud-based network system. Generally, the server computing device 204 includes memory and a processor, and may also include any number and combination of different components as further described with reference to the example device shown in FIG. 10. The server computing device 204 implements the device sharing module 208, such as in software, in hardware, or as a combination of software and hardware components, generally as described with reference to the device sharing module shown in FIG. 1. In this example system 200, the device sharing module 208 is implemented as a software application or modules, such as executable software instructions (e.g., computer-executable instructions) that are executable with a processing system of the server computing device 204 to implement the techniques of shareable devices, as described herein. The device sharing module 208 can be stored on computer-readable storage media, such as any suitable memory device (e.g., the device memory) or electronic data storage implemented in the server computing device 204 for network-based data storage. For example, the server computing device 204 includes the data storage 206 that is utilized to maintain various data that may be received and utilized, and/or generated by the device sharing module 208.

In aspects of deterring theft of shareable devices, the device sharing module 112 that is implemented by the shareable device 102 (e.g., the mobile phone 110) can receive the user identifiable information 202 about a user who indicates an intention to claim the shareable device for temporary use. The user identifiable information 202 may be an image of the user, a video clip of the user, user credentials associated with a wearable device of the user, a credit card scan, a driver's license scan, and/or any other kind of information that is usable to identify the user. In some implementations, the display screen 126 of the shareable device 102 (e.g., the mobile phone 110) may display a user interface prompt 212 in a user interface, prompting the user to provide the user identifiable information 202 in order to access the shareable device. Alternatively or in addition, the user interface prompt 212 may prompt the user to consent to the device sharing module 112 obtaining the user identifiable information 202 about the user. In response to receiving user consent, the device sharing module 112 may then initiate the device to capture a photo of the user, record a video of the user, and/or otherwise prompt the user to enter one or more various forms of user identifiable information.

The device sharing module 112 may then initiate the interactive session 114 allowing the user to access the shareable device 102 in response to receiving the user identifiable information 202 about the user. Thus, the shareable device 102 remains disabled until the device sharing module 112 receives the user identifiable information 202. The device sharing module 112 may then allow the user to access the shareable device 102 responsive to receiving the user identifiable information 202 for which consent was obtained.

Alternatively or in addition, the instantiation of the device sharing module 208 implemented by the server computing device 204 may initiate the interactive session 114 on the shareable device 102, rather than the device sharing module 112 implemented by the shareable device. For example, the device sharing module 112 may receive the user identifiable information 202, which is then communicated to the server computing device 204, such as via the access point 210 over the local area network. The device sharing module 208 implemented by the server computing device 204 can receive the user identifiable information 202 from the shareable device 102. The device sharing module 208 implemented by the server computing device 204 can then communicate an interactive session authorization 214 back to the device sharing module 112 of the shareable device 102 to initiate the interactive session 114 associated with the user on the shareable device.

In some implementations, the user identifiable information 202 may also include an indication of a time duration of the interactive session 114 that is associated with the user who has claimed the shareable device 102 for temporary use. The time duration may identify a start time and an end time of the interactive session 114. Accordingly, the user identifiable information 202 may then identify the user, as well as identify a time that the user accessed the shareable device 102. The device sharing module 112 can also be implemented to receive billing information as part of the user identifiable information 202. Thus, the device sharing module 112 may initiate billing the user based on the time duration of the interactive session 114 associated with the user who is using the shareable device. Alternatively, the device sharing module 208 implemented by the server computing device 204 (e.g., the control device) may initiate billing the user of the shareable device 102 based on the time duration of the interactive session 114 associated with the user who is using the shareable device.

The server computing device 204 can receive the user identifiable information 202 from the shareable device 102, and maintain the information as the user identifiable information 216 in data storage 206 for subsequent reference. In some implementations, the server computing device 204 may also maintain a user access history 218 that correlates with the user identifiable information 216 associated with dates and times that various users have claimed use of the shareable device 102. Thus, if an owner of the shareable device 102 needs to know who had access to the shareable at a given time on a particular date, then the owner of the shareable device may reference the user access history 218. For example, damage to the shareable device 102 may be linked to a certain user based on the user access history 218, and the owner of the shareable device can then bill the user for the damage to the device using the received billing information. In implementations, the user identifiable information 216 and/or the user access history 218 may forced to expire, in which case the server computing device 204 can purge the user identifiable information 216 and/or the user access history 218 from the data storage 206 after a period of time, or number of days, to protect user privacy of the user information and history data.

The device sharing module 112 may also communicate a shareable device location 220 to the server computing device 204 to identify a current location of the shareable device. Generally, the shareable device location 220 corresponds to the current location of the shareable device 102, or corresponds to the last known location of the shareable device, and may be maintained in the data storage 206 of the server computing device. Thus, if the shareable device 102 is lost or stolen, the owner of the shareable device may reference the shareable device location 220 to determine where to find the shareable device, or at least where to start looking for the device.

The device sharing module 112 can be implemented to end the interactive session 114, thereby enabling the shareable device 102 for use by a subsequent user. For example, the device sharing module 112 may end the interactive session 114 that is associated with the user responsive to determining that a predefined time limit associated with the interactive session has expired. In implementations, the interactive session 114 may be constrained to a maximum time limit (e.g., thirty minutes). The device sharing module 112 implemented by the shareable device 102 may also end the interactive session 114 of the user by receiving an indication of user intent to no longer use the shareable device. For example, if the device sharing module 112 detects that the user has not interacted with the shareable device 102 for a predefined amount of time, then the device sharing module 112 may automatically end the interactive session 114. In another example, the device sharing module 112 may receive a command from the user to end the interactive session 114 (e.g., an "end session" command), such as via a user interface control. Alternatively, the device sharing module 112 can receive sensor inputs that indicate the shareable device 102 has been set down by the user, and determine that the user setting the device down is an indication of user intent to no longer use the shareable device.

In other implementations, the device sharing module 208 of the server computing device 204 may also be implemented to initiate ending the interactive session 114 on the shareable device 102 automatically in response to detecting that the shareable device is no longer connected to the network access point 210 of the local network 136. The device sharing module 208 implemented by the server computing device 204 can initiate displaying a notification 222 on the display screen 224 of the server computing device 204 (e.g., the control device) in response to detecting that the shareable device 102 is no longer connected to the network access point 210 of the local network. The owner of the shareable device 102 can then be notified, via the notification 222, when the shareable device is out of range of the local network. In implementations, the device sharing module 208 of the server computing device 204 may initiate the server computing device to emit an audible alarm along with the notification 222 responsive to detecting that the shareable device 102 is no longer connected to the local network.

Alternatively or in addition, the device sharing module 208 implemented by the server computing device 204 can communicate an alarm command 226 from the server computing device (e.g., as the control device) to the shareable device 102, causing the shareable device to emit an audible alarm. A user interface control 228 can be displayed on the display screen 224 of the server computing device 204, and the user interface control 228 is user selectable to initiate the shareable device 102 emitting an audible alarm. Thus, if the shareable device 102 is lost or stolen, or detected as no longer being connected to the network access point 210 of the wireless network, the owner of the shareable device may use the alarm command 226 to assist in locating the shareable device.

The device sharing module 208 implemented by the server computing device 204 can also communicate a disable command 230 from the server computing device to the shareable device 102, thereby disabling the shareable device. In this example, the user interface control 228 displayed on the display screen 224 of the server computing device 204 is also user selectable to disable the shareable device 102 by initiating the disable command 230. Thus, if the shareable device 102 is lost or stolen, or detected as no longer being connected to the network access point 210 of the wireless network, the owner of the shareable device may use the disable command 230 to disable the shareable device, rendering the shareable device less valuable to anyone who has stolen the device, or came across the lost device. Although these examples are described with reference to either the device sharing module 112 implemented by the shareable device 102 or the device sharing module 208 implemented by the server computing device 204, it should be noted that the techniques described herein may be implemented by one or both of the device sharing modules.

User Authentication on a Shareable Device Facilitated by an Additional Device

Figure 3:
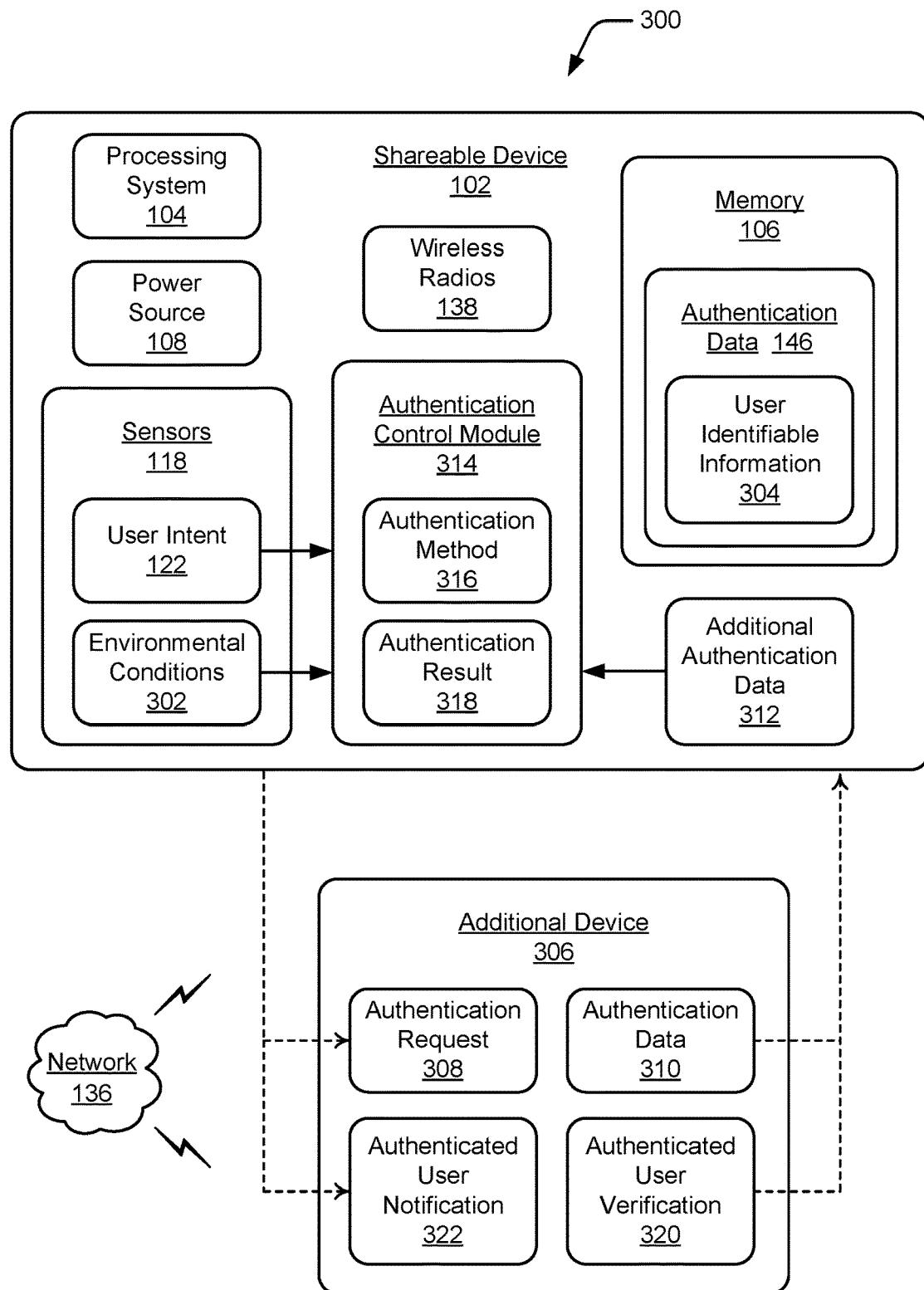
FIG. 3 illustrates another example system in which aspects of shareable devices can be implemented.

FIG. 3 illustrates an example system 300 in which aspects of shareable devices can be implemented, as described herein. This example system 300 includes the shareable device 102 that is shown and described with reference to FIG. 1, and the shareable device can be used to implement techniques of user authentication facilitated by an additional device. The shareable device 102 includes the device sensors 118, which are used to sense or detect an indication of the user intent 122 to use the shareable device 102. By way of example, the sensors 118 may sense that a user is within a close proximity (e.g., within a threshold proximity) of the shareable device 102, from which a determination can be made that the user wishes to use the shareable device 102, such as based on detection of user proximity, approach, and then the user standing within reach of the device. Other indications of user intent 122 may include user actions or commands, such as a voice command, a touch command, walking in and/or turning the lights on in the room where the shareable device 102 is located, or any other indication or communication of user intent 122 to use the shareable device 102.

Moreover, the sensors 118 may detect one or more environmental conditions 302 associated with an environment in which the shareable device 102 is located. For example, the sensors 118 may detect noise above a threshold level and determine that the shareable device 102 is in a noisy environment. Alternatively or in addition, the sensors 118 may detect that the amount of light in the environment is below a threshold level and determine that the shareable device 102 is in a dark environment. Thus, the sensors 118 may detect environmental conditions 302 that correspond to an amount of noise, an amount of light, or any other environmental conditions 302 associated with the environment in which the shareable device 102 is located.

The memory 106 of the shareable device 102 may also store authentication data 146 associated with a user, or users of the device. The authentication data 146 is data that may be used to authenticate a user to use the shareable device 102. For example, the authentication data 146 may be user identifiable information 304 associated with a user that has been authorized to use the shareable device 102, for example, by the owner of the shareable device 102. The shareable device 102 may also receive identifiable information from a user to compare to the user identifiable information 304 stored on the computing device. If the identifiable information received from the user matches the user identifiable information 304 stored on the shareable device 102, then a user may be authenticated to use the shareable device 102. The user identifiable information 304 may be biometric information associated with an authorized user, including, but not limited to, facial information, iris information, voice information, fingerprint information, and/or hand geometry. The shareable device 102 may also store the authentication data 146 associated with multiple users that have been authorized to use the shareable device 102.

In implementations, the shareable device 102 can communicate with other devices via the network 136 (e.g., LTE, WLAN, etc.) or via a direct peer-to-peer connection (e.g., Wi-Fi Direct, Bluetooth™, Bluetooth LE (BLE), RFID, NFC, etc.). The shareable device 102 can include the wireless radios 138 that facilitate wireless communications, as well as communication interfaces that facilitate network communications. For example, the network 136 facilitates communication between the shareable device 102 and an additional device 306. The shareable device 102 and the additional device 306 may be implemented for trusted pairing with each other directly, or through a trusted cloud and/or network connection. Similar to the shareable device 102, the additional device 306 may be any type of a computing device, tablet device, mobile phone, smart watch, a smart TV, a companion device that may be paired with other mobile devices, an IoT (Internet-of-things) device, a camera device, and/or any other type of computing device. The additional device 306 also includes various components, such as a processing system, a memory, as well as any number and combination of different components described with reference to the example device shown in FIG. 5.

In this example 100, the additional device 306 may be representative of a network of additional devices that can be implemented for various different radio-based, wireless signaling, such as with LTE, Near Field Communication (NFC), Real-time Locating System (RTLS), Bluetooth™ devices, and the like. In this example, the environment may also include Internet-of-things (IoT) networked devices, Wi-Fi connected devices, and/or additional mobile, electronic, camera, and/or computing devices. The IoT devices may also include motion sensors, monitoring devices, control devices, and any other type of networked computing and/or electronic devices.

In some instances, such as due to environmental conditions or other factors, the shareable device 102 may not be able to authenticate a user to use the shareable device. In one example, the shareable device 102 may store the authentication data 146 associated with the user, but the computing device may not have the sensor 118 needed to collect identifiable information to compare to the user identifiable information 304 stored on the shareable device 102. However, the additional device 306 may include different sensors and/or sensors similar to those described in relation to sensors 118 of the shareable device 102, and thus, may be equipped with the needed sensor. Accordingly, the shareable device 102 may communicate an authentication request 308 to the additional device 306, which can then collect authentication data 310 from or about the user using its own device sensors and communicate the collected authentication data 310 back to the shareable device 102. Accordingly, the shareable device 102 receives the additional authentication data 312 from the additional device 306. The shareable device 102 may then use the additional authentication data 312 to assist in authenticating the user to use the shareable device 102.

In implementations, the shareable device 102 and the additional device 306 may be in close proximity to each other to facilitate authentication of the user to use the shareable device 102. Thus, proximity information may be determined via wireless ranging techniques implemented by the sensors 118 of the shareable device 102 and sensors of the additional device 306, such as RSSI (received signal strength indication) between the shareable device 102 and the additional device 306, TOF (time-of-flight) between the devices, beacon reception, proximity to a WiFi access point to which both the shareable device 102 and the additional device 306 are connected, etc. The proximity information may also be determined by absolute position of the shareable device 102 and the additional device 306, for example using GPS (global positioning system) or any other type of location and/or positioning system. In other implementations, the additional device 306 may be a remote device with reference to the location of the device relative to the shareable device 102. In this example, the shareable device 102 may maintain a network connection to the additional device 306 at any distance, such as via an access point in a local network system or via other network configurations that facilitate data communication between the devices. As such, the shareable device 102 may submit the authentication request 308 to the additional device 306 even if the shareable device 102 and the additional device 306 are not in close proximity.

In this example 100, the shareable device 102 includes an authentication control module 314 that implements features of user authentication facilitated by an additional device, as described herein. The authentication control module 314 may be implemented as a module that includes independent processing, memory, and logic components functioning as a computing and/or electronic device integrated with the shareable device 102. Alternatively or in addition, the authentication control module 314 can be implemented as a software application or software module, such as with the operating system and as computer-executable software instructions that are executable with a processor (e.g., with the processing system 104) of the shareable device 102. As a software application or module, the authentication control module 314 can be stored on computer-readable storage memory (e.g., the memory 106 of the device), or any other suitable memory device or electronic data storage implemented with the authentication control module 314. Alternatively or in addition, the authentication control module 314 may be implemented in firmware and/or at least partially in computer hardware. For example, at least part of the authentication control module 314 may be executable by a computer processor, and/or at least part of the invention module may be implemented in a hardware circuit.

The authentication control module 314 is implemented to receive an indication of the user intent 122 to use the shareable device 102. As noted above, the sensors 118 of the shareable device 102 may be implemented to detect the user intent 122 to use the shareable device 102. By way of example, an indication of user intent 122 may be received when the sensors 118 detect that a user is within a threshold proximity or approaching proximity of the shareable device 102. Other indications of user intent 122 are considered, including, but not limited to, detecting a voice command, detecting a touch input, detecting the lights turning on in a room, and/or detecting a user entering a room.

The authentication control module 314 is also implemented to determine that the additional device 306 is equipped to facilitate authentication of a user to the shareable device 102 using an authentication method 316. The authentication method 316 may be any method capable of authenticating a user, including, but not limited to, voice recognition, facial recognition, fingerprint recognition, iris recognition, hand geometry recognition, and so forth. The authentication control module 314 can be implemented to make such a determination based on the shareable device 102 being unable to authenticate the user without receiving the additional authentication data 312 from the additional device 306. For instance, the shareable device 102 may store the authentication data 146 associated with the user, but may not be equipped with a sensor 118 to facilitate authentication. By way of example, the shareable device 102 may store facial information as part of the authentication data 146, but may not be equipped with a camera, which would be needed to obtain an image of the user to perform the authentication method 316 of facial recognition.

In another example, the authentication control module 314 can be implemented to determine that the shareable device 102 is unable to authenticate the user based on one or more environmental conditions 302 that prevent detection of user identifiable information 304. For example, the shareable device 102 may store facial information and voice information as the user identifiable information 304. The shareable device 102 may also be equipped with a camera to capture an image of the user to facilitate the authentication control module 314 performing the authentication method 316 of facial recognition. However, due to a dark environment (e.g., environmental conditions 302) detected by the device sensors 118, the shareable device 102 may be unable to authenticate the user with facial recognition.

The authentication control module 314 may select the authentication method 316 based on the one or more environmental conditions 302. As part of this, the additional device 306 may be equipped to perform an authentication method despite the environmental conditions 302 that prevent detection of user identifiable information 304 at the shareable device 102. Thus, the additional device 306 may perform the available authentication method 316 to facilitate authentication of the user to the shareable device 102. In the example of a dark environment being detected, an authentication method 316 that does not involve a camera may be selected, such as voice recognition. The additional device 306 may be equipped with a microphone, and is thus capable of performing an authentication method using voice recognition despite the dark environment. Therefore, the additional device 306 may collect voice data as the authentication data 310 that is then communicated to the shareable device 102 in order to facilitate authentication of the user to the computing device by voice recognition.

The authentication control module 314 can receive the additional authentication data 312 associated with the user from the additional device 306. Upon determining that the additional device 306 is equipped to facilitate authentication of the user to the shareable device 102 using an authentication method 316, the shareable device 102 can communicate an authentication request 308 to the additional device 306. The additional device 306 may then collect the authentication data 310 according to the authentication method 316. The collected authentication data 310 may be user identifiable information, similar to the user identifiable information 304 stored at the shareable device 102 (e.g., facial information, iris information, voice information, fingerprint information, hand geometry, etc.). The collected authentication data 310 can then be transmitted to the shareable device 102 to be received as the additional authentication data 312.

The authentication control module 314 is implemented to authenticate the user to use the shareable device 102 based on the additional authentication data 312 received from the additional device 306. For instance, the additional authentication data 312 received from the additional device 306 may be compared to the authentication data 146 stored on shareable device 102 to generate an authentication result 318. If the additional authentication data 312 matches the authentication data 146 stored on the shareable device 102, then the authentication result 318 is successful and the user may be authenticated to use the shareable device 102. Alternatively if the additional authentication data 312 does not match the authentication data 146 stored on the shareable device 102, then the authentication result 318 is unsuccessful and the user is not authenticated to use the shareable device 102. The authentication may be performed using solely additional authentication data 312 received from the additional device 306, solely authentication data 146 collected by the sensors 118 of the shareable device 102, or a combination of the additional authentication data 312 and the authentication data 146 received from the sensors 118 of the shareable device 102.

In an example implementation, the additional authentication data 312 may be received as an authenticated user verification 320, which verifies that the user has been authenticated by the additional device 306 to use the additional device. Similar to the shareable device 102, the additional device 306 may store the authentication data 310 in memory of the additional device. Thus, in response to receiving the authentication request 308 from the shareable device 102, the sensors of the additional device 306 may collect identifiable information associated with the user. The identifiable information associated with the user may then be compared to the authentication data 310 stored on the additional device 306. If the identifiable information associated with the user matches the authentication data 310 stored on the additional device 306, then the user may be authenticated to use the additional device 306. Accordingly, the additional device 306 may transmit an authenticated user verification 320 to the shareable device 102. The shareable device 102 may then authenticate the user based on the authenticated user verification 320 received from the additional device 306.

In another implementation, the shareable device 102 may transmit the authentication result 318 to the additional device 306 to be received as an authenticated user notification 322. The authenticated user notification 322 indicates whether the user has been successfully authenticated to use the shareable device 102. If the authenticated user notification 322 indicates that the user was successfully authenticated to use the shareable device 102, then the additional device 306 may authenticate the user to use the additional device 306 as well. If the authenticated user notification 322 indicates that the user was not successfully authenticated to use the shareable device 102, the additional device 306 may then transmit more authentication data 310 to the shareable device 102 to assist in authentication.

In another example, the authentication data 310 may be collected at the additional device 306 prior to the shareable device 102 receiving an indication of user intent 122 to use the shareable device 102. In this example, the user may still be authenticated to use the shareable device 102 based on the collected authentication data 310 if the time between collecting the authentication data 310 and receiving the indication of user intent 122 at the shareable device 102 is less than a threshold amount. For example, a user may walk by the additional device 306, and the additional device may collect the authentication data 310. The collected authentication data 310 may still be used to facilitate authentication of the user to the shareable device 102 if the computing device receives an indication of the user intent 122 to use the shareable device 102 within a threshold amount of time (e.g., ten seconds, several minutes, or longer) of the authentication data 310 being collected. Although these examples are generally described with reference to the authentication control module 314 that is implemented by the shareable device 102 performing user authentication of a user to the computing device based on the additional authentication data 312 received from the additional device 306, it should be noted that the described roles of the devices (or alternate devices) may be reversed, in which case the shareable device 102 may facilitate authenticating a user to the additional device 306.

Example methods 400, 500, 600, 700, 800, and 900 are described with reference to respective FIGS. 4-9 in accordance with implementations of shareable devices. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
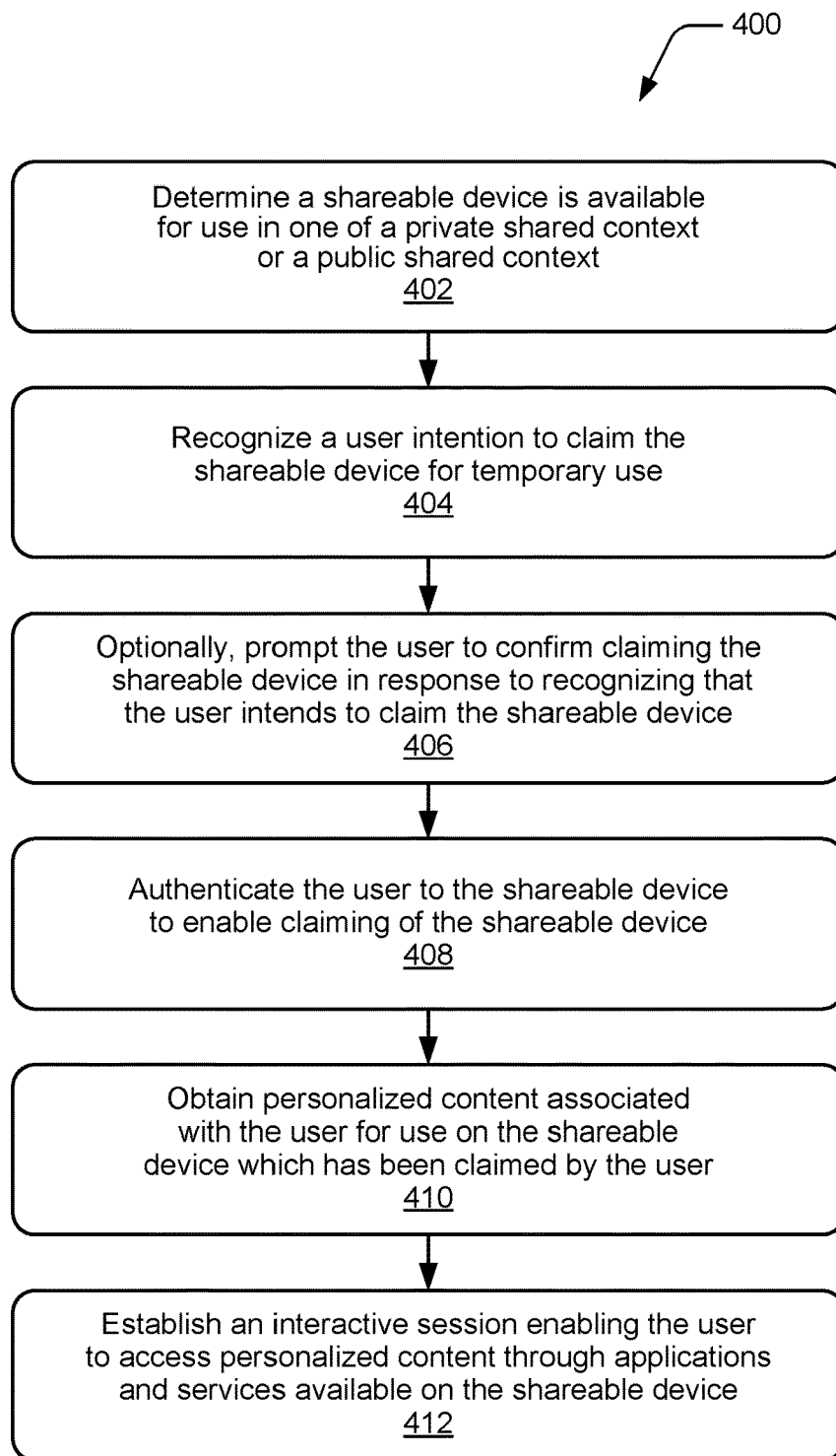
FIGS. 4 and 5 illustrate example methods of shareable devices, generally in the context to claim a shareable device for a personalized interactive session, as implemented in accordance with one or more implementations of the techniques described herein.

FIG. 4 illustrates example method(s) 400 of shareable devices, and is generally described with reference to a device sharing module implemented by a shareable device. The order in which the method is described is not intended to be construed as a limitation, and any number or combination of the described method operations can be performed in any order to perform a method, or an alternate method.

At 402, a shareable device is determined to be available in one of a private shared context or a public shared context. For example, the device sharing module 112 implemented by the shareable device 102 determines the shared context 116 in an environment of the shareable device. The shared context 116 of the shareable device 102 may be a private shared context for the types of shareable devices that can be claimed, used, and shared between family members, friends, or co-workers. Alternatively, the shared context 116 of the shareable device 102 may be a public shared context for the types of shareable devices that can be claimed, used, and shared by generally any member of the public. In a private shared context, the shareable device 102 may be claimed automatically by a user, whereas in a public shared context, the shareable device 102 may be claimed with intentional user action.

At 404, a user intention to claim the shareable device for temporary use is recognized. For example, the device sharing module 112 implemented by the shareable device 102 recognizes a user intention to claim the shareable device for temporary use as the user intent 122, such as detected by the sensors 118 of the device. The user intent 122 may be recognized based on a user gesture, an audible input, a user biometric input, user lip-tracking, user proximity to the shareable device being within a distance threshold, shareable device movement, shareable device orientation, user input via a user interface of the device (e.g., as a user passcode, a user PIN, selection of a displayed selectable control, etc.), and/or any other indication of the user intent 122 to claim and temporarily use the device.

At 406, the user is optionally prompted to confirm claiming the shareable device in response to recognizing that the user intends to claims the shareable device. For example, the device sharing module 112 implemented by the shareable device 102 can initiate to display the user interface prompt 124 in a user interface on the display screen 126 of the device to prompt a user to confirm his or her intention to claim the shareable device. The user may respond to the user interface prompt 124 by way of a manual user input entered in the user interface on the display screen 126 and/or by other techniques used to recognize the user intent 122, such as by the device sensors 118. Alternatively, some user actions may show explicit intent to claim the shareable device 102, in which case user confirmation may not be needed to continue with user authentication.

At 408, the user is authenticated to the shareable device to enable claiming of the shareable device. For example, the device sharing module 112 implemented by the shareable device 102 authenticates the user to the shareable device, enabling the user to claim the shareable device for temporary use. The device sharing module 112 can receive, such as via a communication interface, the wireless radios 138, or the sensors 118, the user authentication information 142, which may be provided passively without user input and/or actively by the user manually inputting or otherwise providing a passcode unique to the user. The user authentication information 142 that can be obtained passively can include biometrics, such as a face ID, a touch ID, and/or by voice recognition. In some implementations, the user authentication information 142 is received from a wearable device 144 that can communicate the user authentication information 142 via the network 136 to the shareable device 102. The user authentication information 142 collected from the user and/or from another device can be compared to the authentication data 146 that is stored in memory 106 or in a cloud database to perform the authentication. The authentication data 146 can include existing account credentials that are associated with an identity of the user, such as for previous users of the device whose authentication data is stored on the device for subsequent use by a returning user.

At 410, personalized content associated with the user is obtained for use on the shareable device which has been claimed by the user. For example, the device sharing module 112 implemented by the shareable device 102 obtains the personalized content 128 that is associated with the user for use on the shareable device. The device sharing module 112 can obtain the personalized content 128 that is associated with the user based in part on the determination of the shared context 116 in which the shareable device 102 is being claimed for temporary use. The personalized content 128 can also be obtained based on profiles and accounts associated with the user that are activated when the user is determined to claim the shareable device 102. For example, the personalized content 128 may be obtained by loading SIM information 134 of the user from a SIM profile associated with the user. This SIM information 134 can enable network data communications for the particular user via the shareable device 102. Additionally, the device sharing module 112 may obtain any type of the personalized content 128 associated with the user who has claimed the shareable device, such as incoming phone calls, text messages, emails, calendar updates, photo albums, social media, entertainment media, and/or emails, by accessing cloud services accounts associated with the user.

At 412, an interactive session is established to enable the user to access the personalized content through applications and services available on the shareable device. For example, the device sharing module 112 implemented by the shareable device 102 establishes the interactive session 114, which enables the user to access the personalized content 128 of the user through the device applications 130 and/or via services available on or through the shareable device 102. The device sharing module 112 can request login credentials from the user as an additional security step in order to establish the interactive session 114 for the user on the shareable device 102, and prior to the user gaining access to the personalized content 128 on or from the shareable device. The interactive session 114 can be initiated and/or established for a user who wants to access and interact with his or her own accounts, applications, personal information, and/or services that are associated with the user. Notably, the interactive session 114 exposes the personalized content 128 and the notifications 132 that are associated exclusively with the particular user while the user has claim to the shareable device 102. The device sharing module 112 is also designed to exclude any personalized content and/or notifications that may be associated with a previous user of the shareable device.

Figure 5:
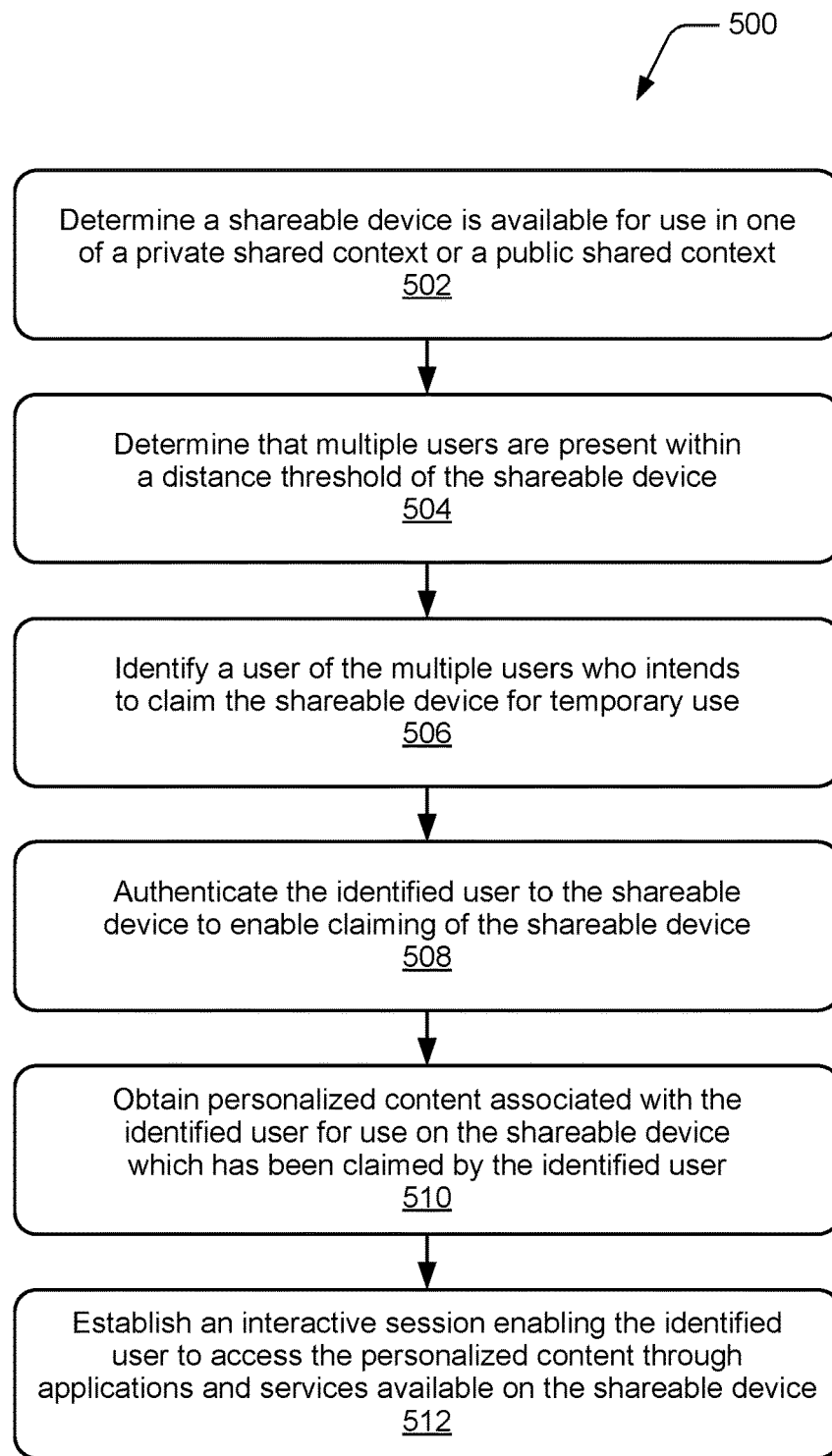

FIG. 5 illustrates example method(s) 500 of shareable devices, and is generally described with reference to a device sharing module implemented by a shareable device. The order in which the method is described is not intended to be construed as a limitation, and any number or combination of the described method operations can be performed in any order to perform a method, or an alternate method.

At 502, a shareable device is determined to be available in one of a private shared context or a public shared context. For example, the device sharing module 112 implemented by the shareable device 102 determines the shared context 116 in an environment of the shareable device. The shared context 116 of the shareable device 102 may be a private shared context for the types of shareable devices that can be claimed, used, and shared between family members, friends, or co-workers. Alternatively, the shared context 116 of the shareable device 102 may be a public shared context for the types of shareable devices that can be claimed, used, and shared by generally any member of the public. In a private shared context, the shareable device 102 may be claimed automatically by a user, whereas in a public shared context, the shareable device 102 may be claimed with intentional user action.

At 504, multiple users are determined to be present within a distance threshold of the shareable device. For example, the device sharing module 112 implemented by the shareable device 102 may determine that multiple users 120 are within a threshold distance proximate the shareable device 102, such as based on input from the sensors 118. Additionally, the device sharing module 112 can determine, based on the sensor data, the respective distances of the multiple users 120 relative to the location of the shareable device 102.

At 506, a user of the multiple users who intends to claim the shareable device for temporary use is identified. For example, the device sharing module 112 implemented by the shareable device 102 identifies one of the multiple users 120 who intends to claims the shareable device 102 for temporary use. The user who is determined to have the user intent 122 to claim the shareable device 102 can be identified based on the respective distances of the multiple users 120 from the location of the shareable device, based on a distance threshold proximate the shareable device, and/or based on a gesture or user input indicative of intent to claim the shareable device 102 as described in detail above. In the event that multiple users express user intent 122 to claim the shareable device 102 at the same time, the device sharing module 112 can implement a variety of techniques to prioritize users, such as a status associated with user identities and/or a first-come-first-served basis. In an environment in which the identified user is the only user present within a distance threshold proximate the shareable device 102, the device sharing module 112 can enable automatic claiming of the shareable device 102 by the identified user.

At 508, the user is authenticated to the shareable device to enable claiming of the shareable device. For example, the device sharing module 112 implemented by the shareable device 102 authenticates the user to the shareable device, enabling the user to claim the shareable device for temporary use. The device sharing module 112 can receive, such as via a communication interface, the wireless radios 138, or the sensors 118, the user authentication information 142, which may be provided passively without user input and/or actively by the user manually inputting or otherwise providing a passcode unique to the user. The user authentication information 142 that can be obtained passively can include biometrics, such as a face ID, a touch ID, and/or by voice recognition. In some implementations, the user authentication information 142 is received from a wearable device 144 that can communicate the user authentication information 142 via the network 136 to the shareable device 102. The user authentication information 142 collected from the user and/or from another device can be compared to the authentication data 146 that is stored in memory 106 or in a cloud database to perform the authentication. The authentication data 146 can include existing account credentials that are associated with an identity of the user, such as for previous users of the device whose authentication data is stored on the device for subsequent use by a returning user. The claimability can be initiated by a wearable device worn by the user communicating credentials through the body of the user via electric or magnetic coupling to the shareable device that is touched by the user.

At 510, personalized content associated with the identified user is obtained for use on the shareable device which has been claimed by the identified user. For example, the device sharing module 112 implemented by the shareable device 102 obtains the personalized content 128 that is associated with the user for use on the shareable device. The device sharing module 112 can obtain the personalized content 128 that is associated with the user based in part on the determination of the shared context 116 in which the shareable device 102 is being claimed for temporary use. The personalized content 128 can also be obtained based on profiles and accounts associated with the user that are activated when the user is determined to claim the shareable device 102. For example, the personalized content 128 may be obtained by loading SIM information 134 of the user from a SIM profile associated with the user. This SIM information 134 can enable network data communications for the particular user via the shareable device 102. Additionally, the device sharing module 112 may obtain any type of the personalized content 128 associated with the user who has claimed the shareable device, such as incoming phone calls, text messages, emails, calendar updates, photo albums, social media, entertainment media, and/or emails, by accessing cloud services accounts associated with the user.

At 512, an interactive session is established to enable the identified user to access the personalized content through applications and services available on the shareable device. For example, the device sharing module 112 implemented by the shareable device 102 establishes the interactive session 114, which enables the user to access the personalized content 128 of the user through the device applications 130 and/or via services available on or through the shareable device 102. The device sharing module 112 can request login credentials from the user as an additional security step in order to establish the interactive session 114 for the user on the shareable device 102, and prior to the user gaining access to the personalized content 128 on or from the shareable device. The interactive session 114 can be initiated and/or established for a user who wants to access and interact with his or her own accounts, applications, personal information, and/or services that are associated with the user. Notably, the interactive session 114 exposes the personalized content 128 and the notifications 132 that are associated exclusively with the particular user while the user has claim to the shareable device 102. The device sharing module 112 is also designed to exclude any personalized content and/or notifications that may be associated with a previous user of the shareable device.

Figure 6:
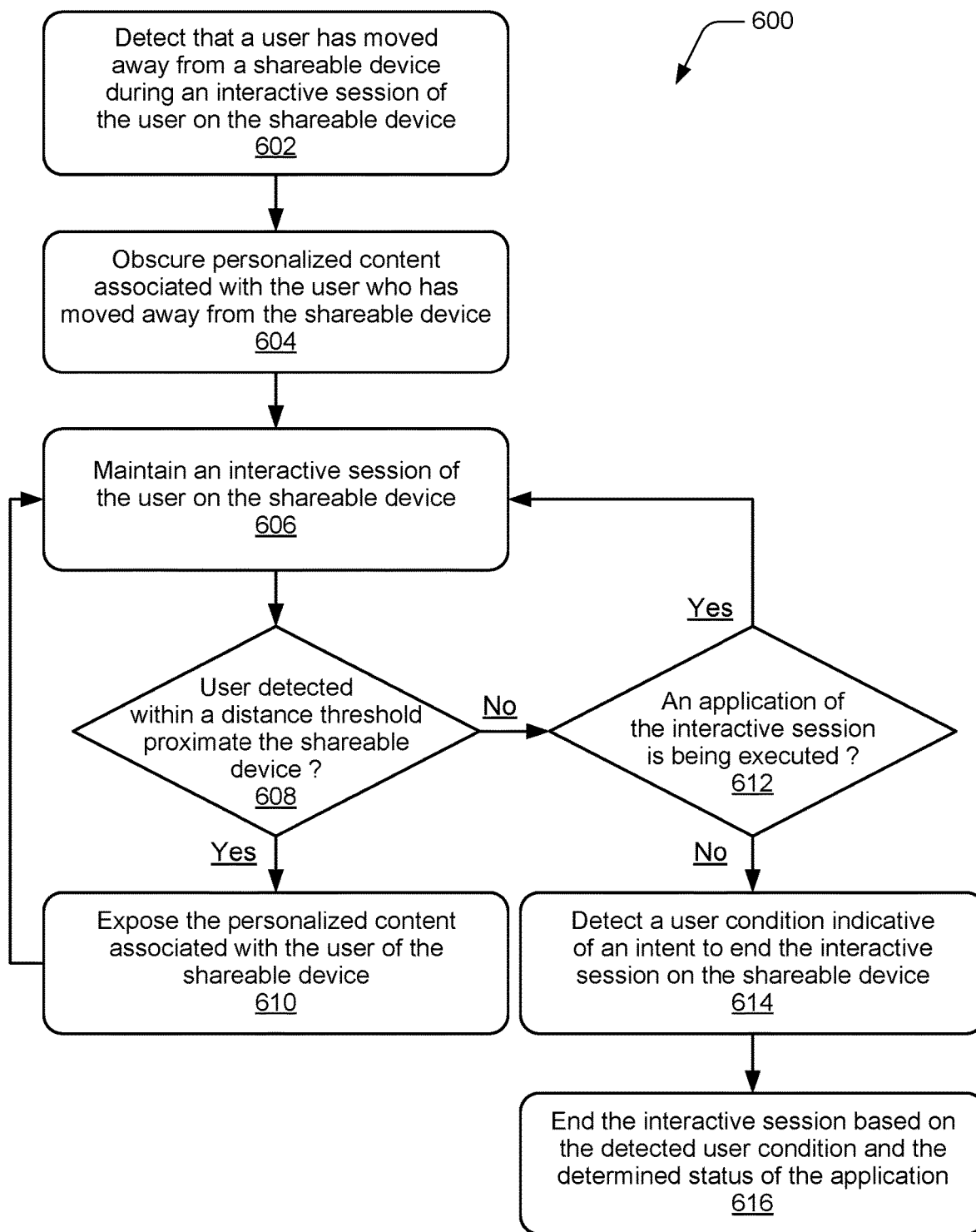
FIGS. 6 and 7 illustrate example methods of shareable devices, generally in the context to end a shareable device interactive session based on user intent, as implemented in accordance with one or more implementations of the techniques described herein.

FIG. 6 illustrates example method(s) 600 of shareable devices, and is generally described with reference to a device sharing module implemented by a shareable device. The order in which the method is described is not intended to be construed as a limitation, and any number or combination of the described method operations can be performed in any order to perform a method, or an alternate method.

At 602, a user is detected as having moved away from a shareable device during an interactive session of the user on the shareable device. For example, the device sharing module 112 implemented by the shareable device 102 can detect, using the sensors 118, that a user has moved away from the shareable device 102 during an interactive session 114 that has been established for the user on the shareable device 102. The sensors 118 may be configured as motion sensors, cameras, face detectors, depth sensors, and/or presence sensors to identify whether a user has moved away from the shareable device, as well as how far away the user is from the device.

At 604, personalized content associated with the user who has moved away from the shareable device is obscured. For example, the device sharing module 112 implemented by the shareable device 102 obscures the personalized content 128 that is associated with the user who has moved away from the shareable device 102. Obfuscation of the personalized content 128 prevents the display and/or viewing of the personalized content during the interactive session 114 that is associated with the user on the shareable device 102 to provide additional security of the content.

At 606, an interactive session of the user is maintained on the shareable device. For example, the device sharing module 112 implemented by the shareable device 102 can maintain the interactive session 114 of the user on the shareable device 102, while also obscuring the personalized content 128 (at block 604) for the user that has moved away from the shareable device. In implementations, the interactive session 114 of the user may be maintained by the device sharing module 112 based on the determination of the shared context 116 for using the shareable device 102, such as whether the shareable device is intended for shareable use in a private shared context or a public shared context. Additionally, the device sharing module 112 can maintain the interactive session 114 in response to activation of a share mode on the shareable device 102, which enables a different person or user to use the shareable device along with the user who has claimed the shareable device for temporary use.

At 608, a determination is made as to whether the user is detected within a distance threshold proximate the shareable device. For example, the device sharing module 112 implemented by the shareable device 102 can determine whether the user is within a threshold distance proximate the shareable device 102, such as based on input from the device sensors 118. If the user is detected to be within the distance threshold proximate the shareable device (i.e., "Yes" from 608), then at 610, the personalized content associated with the user of the shareable device is exposed. For example, the device sharing module 112 implemented by the shareable device 102 can initiate to display or expose the previously obscured personalized content 128 so that the user can continue the interactive session 114 on the shareable device. The user can then continue the interactive session 114 with the personalized content 128 that is specific to the particular user of the shareable device.

If the user is not detected to be within the distance threshold proximate the shareable device, or the user is not physically touching the device (i.e., "No" from 608), then at 612, a determination is made as to whether an application associated with the interactive session of the user is being executed. For example, the device sharing module 112 implemented by the shareable device 102 can determine the status of one or more of the device applications 130 that are being used or are usable on the shareable device 102 during the interactive session 114 of the user. The device sharing module 112 can determine an application status as any indication of an active status, such as device applications 130 that are currently being used by the user or are performing a background task on the shareable device, or an inactive status that indicates device applications 130 that are not in use and/or are not performing a background task. Additionally, the device sharing module 112 can detect changes in the status of a device application 130, such as a change from an active to an inactive status, as well as the amount of time that a device application has been active or inactive. The device sharing module 112 can use both a detected user condition 148 and a determined status of the device applications 130 to determine whether or not to maintain the interactive session 114 on the shareable device 102.

If the status of the application associated with the interactive session of the user is that the application is currently being executed (i.e., "Yes" from 612), then the method continues at 606 to maintain the interactive session 114 of the user on the shareable device 102. If the status of the application associated with the interactive session of the user is that the application is not being executed, such as inactive, in standby, or in an idle mode (i.e., "No" from 612), then at 614, a user condition indicative of an intent to end the interactive session on the shareable device is detected. For example, the device sharing module 112 implemented by the shareable device 102 can detect, such as by using the sensors 118, a user condition 148 indicative of an intent to end the interactive session 114 on the shareable device 102.

The user condition 148 may be detected as the user moving away from the shareable device for more than a designated time duration, the user moving more than a designated distance away from the shareable device, or a combination thereof. The device sharing module 112 can detect the user condition 148 automatically, without a manual user input from the user who is associated with the current interactive session 114 on the device. Alternatively or in addition, the user condition 148 that is indicative of the user intent 122 to end the interactive session 114 can be indicated by way of a user gesture, an audible input, a user biometric input, user lip-tracking, shareable device movement, shareable device orientation, and/or a user input via a user interface of the shareable device.

At 616, the interactive session is ended based on the detected user condition and the determined status of the application. For example, the device sharing module 112 implemented by the shareable device 102 ends the interactive session 114 of the user on the shareable device 102, such as based on the detected user condition 148 and/or the determined status of a device application 130. For example, the device sharing module 112 can end the interactive session 114 in response to the determination that the status of a device application 130 is inactive, has been active for greater than a defined time threshold, and/or has changed from an active to an inactive status. Alternatively or in addition, the device sharing module 112 can end the interactive session 114 in response to detected user conditions that indicate intent to end the session, such as those described above. The device sharing module 112 ending an interactive session 114 can include a logout of the current user, as well as removal of the personalized content 128 that is associated with the current user and interactive session 114. When the device sharing module 112 ends the interactive session 114, the shareable device 102 becomes available for a new user to claim and temporarily use the device.

Figure 7:
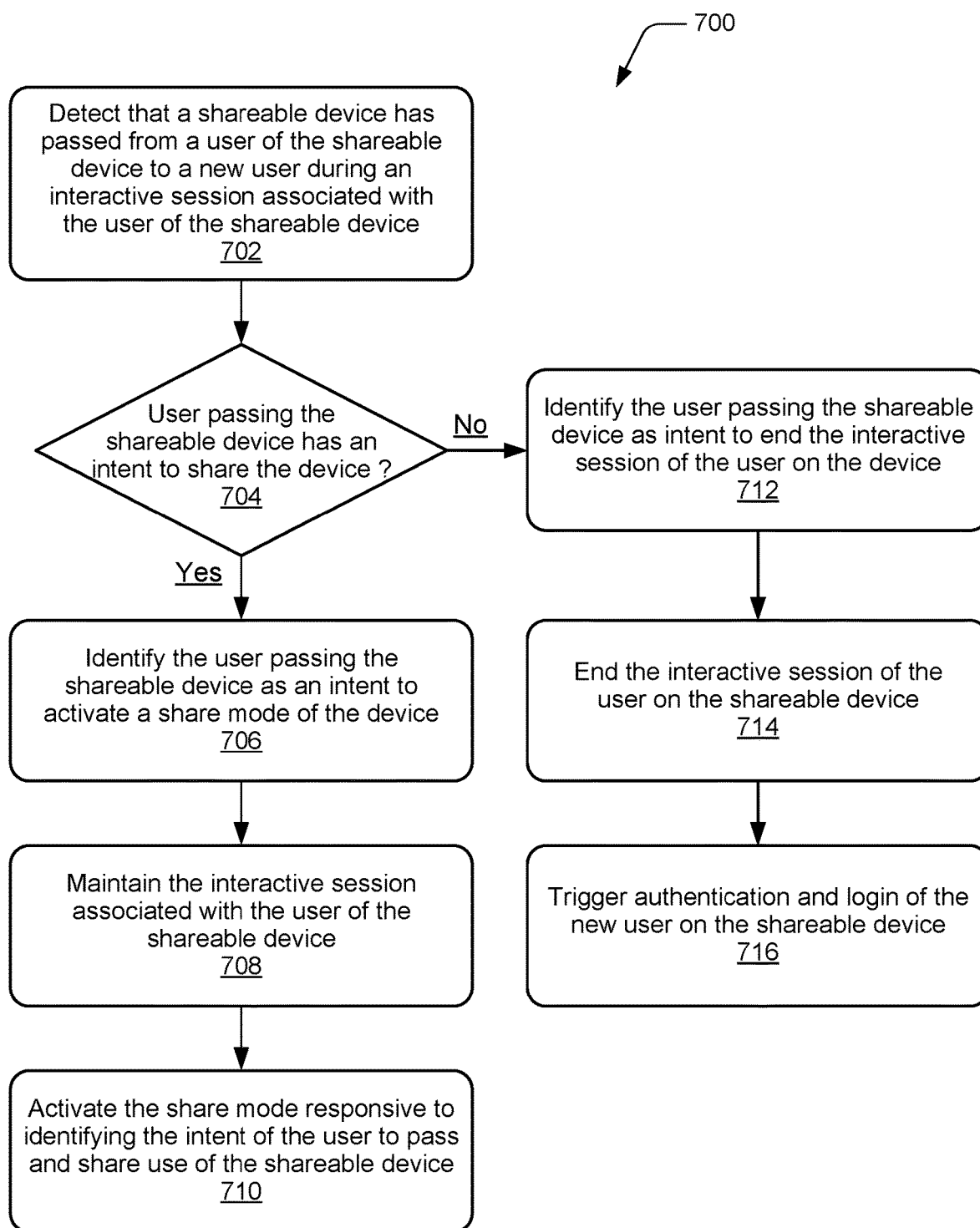

FIG. 7 illustrates example method(s) 700 of shareable devices, and is generally described with reference to a device sharing module implemented by a shareable device. The order in which the method is described is not intended to be construed as a limitation, and any number or combination of the described method operations can be performed in any order to perform a method, or an alternate method.

At 702, a shareable device passing from a user of the shareable device to a new user is detected during an interactive session associated with the user of the shareable device. For example, the device sharing module 112 implemented by the shareable device 102 can detect, such as by using the sensors 118, that the shareable device 102 has passed from the current user of the shareable device 102 to a new, additional user during the interactive session 114 that is associated with the current user. In implementations, the sensors 118 may be configured as any one or more of motion sensors, cameras, face detectors, depth sensors, and/or presence sensors to identify whether the shareable device 102 has been passed from the current user to a new user.

At 704, a determination is made as to whether the user passing the shareable device has an intent to share the device with another user during the interactive session. For example, the device sharing module 112 implemented by the shareable device 102 can determine or otherwise identify the intent of the current user when passing the shareable device 102 to the additional user, such as based on the personalized content 128 that is being displayed on the shareable device. For example, the current user may be using the mobile phone 110 as the shareable device to display a digital photo album, and the user may pass the device to another person, allowing the other person to also view the digital images in the photo album. The device sharing module 112 may determine that the photo album is the type of content likely to be shared among users. Alternatively or in addition, the device sharing module 112 may identify user intent of using the shareable device 102 based on a user input. The user input, detected using the sensors 118, may include a user gesture, an audible input, a user biometric input, user lip-tracking, detected user proximity to the shareable device, shareable device movement, shareable device orientation, a user pass code, a user PIN, and/or selection of a selectable control displayed on the user interface.

If the user is determined to be passing the shareable device for the purpose of sharing the device with another user (i.e., "Yes" from 704), then at 706, the user passing the shareable device is identified as having an intent to activate a share mode of the device. For example, the device sharing module 112 implemented by the shareable device 102 identifies the user intent 122 to activate a share mode of the device. The device sharing module 112 can identify the user intent based on various features, such as the personalized content 128 being displayed on the shareable device 102, a user input, and/or facial detection of the user and the new user together. Additionally, the identification of user intent 122 to activate a share mode of the device can include any of the techniques described in detail above for identification of user intent 122 to claim the shareable device 102 or end an interactive session on the shareable device.

At 708, the interactive session that is associated with the user of the shareable device is maintained. For example, the device sharing module 112 implemented by the shareable device 102 can maintain the interactive session 114 that is associated with the user who has claimed the shareable device for temporary use. The device sharing module 112 maintains the interactive session 114 for the user during activation of the share mode on the device. At 710 the share mode is activated responsive to identifying of the intent of the user to pass and share use of the shareable device. For example, the device sharing module 112 implemented by the shareable device 102 can activate the share mode that enables the new user (or an additional user) to use the shareable device 102 along with the current user who has claimed the shareable device. The share mode enables the new user to also participate in the interactive session 114 of the user on the shareable device 102.

If the user is determined to be passing the shareable device for the purpose of ending the interactive session (i.e., "No" from 704), then at 712, the user passing the shareable device is identified as having an alternate intent to end the interactive session of the user on the shareable device. For example, the device sharing module 112 implemented by the shareable device 102 identifies the user intent 122 to end the interactive session 114 of the user on the shareable device 102. The device sharing module 112 can identify the alternate intent of the user to end the interactive session on the device based on user input, speech analysis, and/or similar factors as used to identify an intent to share the device.

At 714, the interactive session of the user is ended on the shareable device. For example, the device sharing module 112 implemented by the shareable device 102 can end the interactive session 114 of the current user on the shareable device in response to identifying the intent to end the session. The device sharing module 112 ending the interactive session 114 for the current user can include logging-out the current user from the device, as well as removal of the personalized content 128 that is associated with the interactive session 114 of the user. The device sharing module 112 can also end the interactive session by logging-out the user and removing the personalized content 128 without receiving user input from the user of the shareable device.

At 716, authentication and login of the new user is triggered on the shareable device. For example, the device sharing module 112 implemented by the shareable device 102 can trigger authentication and login of the new user of the shareable device 102, where the login of the new user may be performed automatically and without user input from the new user. The device sharing module 112 can authenticate the new user to the shareable device 102 to enable claiming of the shareable device 102 by the new user.

Figure 8:
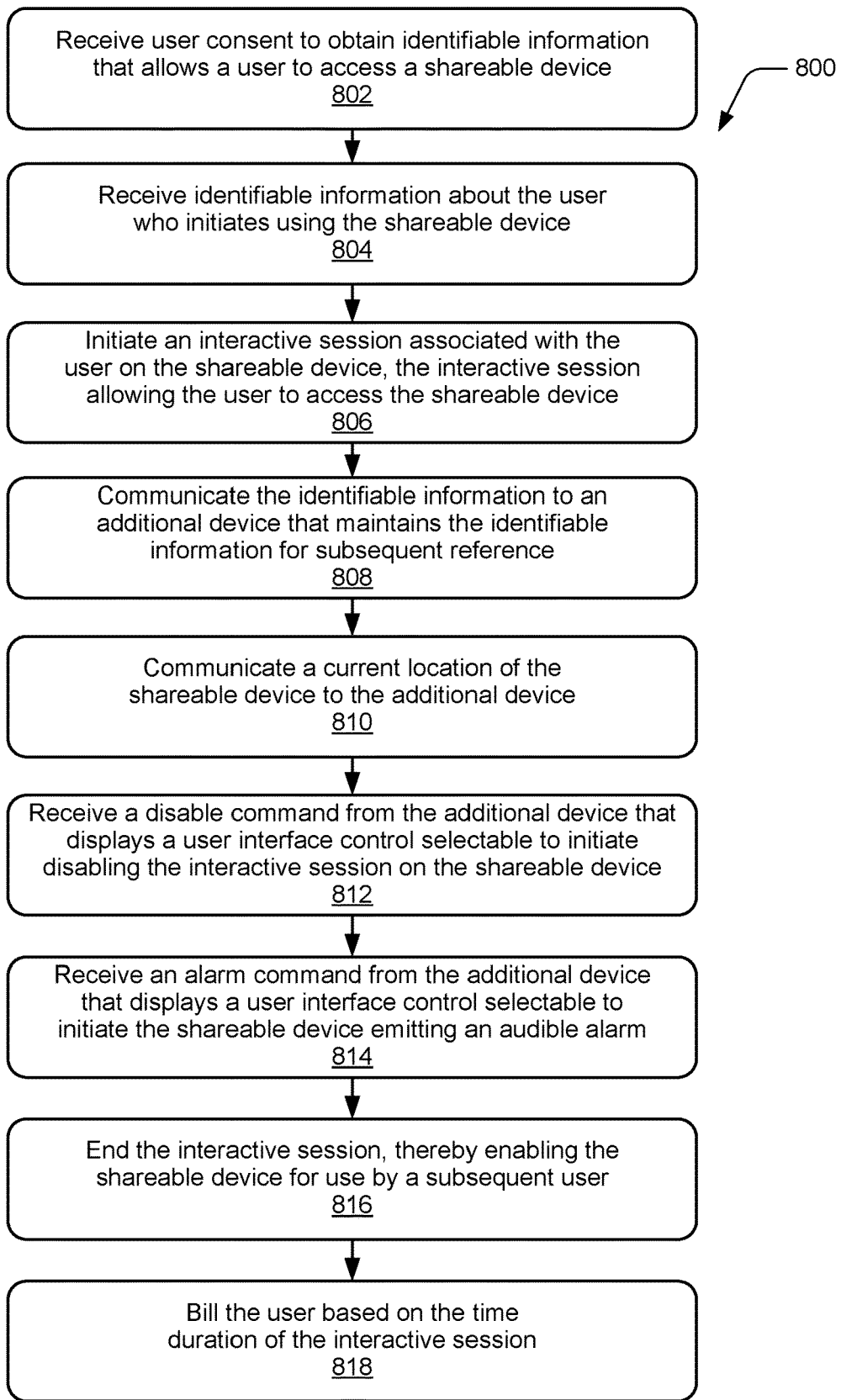
FIGS. 8 and 9 illustrate example methods of shareable devices, generally in the context to initiate a shareable device interactive session based on user identifiable information, as implemented in accordance with one or more implementations of the techniques described herein.

FIG. 8 illustrates example method(s) 800 of shareable devices, and is generally described with reference to a device sharing module implemented by a shareable device. The order in which the method is described is not intended to be construed as a limitation, and any number or combination of the described method operations can be performed in any order to perform a method, or an alternate method.

At 802, user consent is received to obtain identifiable information that allows a user to access a shareable device. For example, the device sharing module 112 implemented by the shareable device 102 can receive user consent from a user to obtain the user identifiable information 202 about the user who claims the shareable device for temporary use. The display screen 126 of the shareable device 102 (e.g., the mobile phone 110) can display the user interface prompt 212, prompting the user to consent to the device sharing module 112 obtaining the user identifiable information 202 about the user.

At 804, identifiable information about the user who initiates using the shareable device is received. For example, the device sharing module 112 implemented by the shareable device 102 receives the user identifiable information 202 from the user who initiates using the shareable device 102. The display screen 126 of the shareable device 102 (e.g., the mobile phone 110) can display the user interface prompt 212, prompting the user to provide the user identifiable information 202 in order to access the shareable device. The user identifiable information 202 may be a captured digital image of the user, a video clip of the user, user credentials associated with a wearable device of the user, a credit card scan, a driver's license scan, and/or any other kind of information that is usable to identify the user. The user identifiable information 202 may also include an indication of a time duration of the interactive session 114 that is associated with the user who has claimed the shareable device 102 for temporary use, and the time duration may identify a start time and an end time of the interactive session 114.

At 806, an interactive session associated with the user is initiated on the shareable device, where the interactive session allows the user to access the shareable device. For example, the device sharing module 112 implemented by the shareable device 102 initiates the interactive session 114 associated with the user, allowing the user to access the shareable device 102 in response to receiving the user identifiable information 202 about the user.

At 808, the identifiable information is communicated to an additional device that maintains the identifiable information for subsequent reference. For example, the shareable device 102 communicates the user identifiable information 202 to the server computing device 204, such as via the access point 210 over the local area network. The server computing device 204 can receive the user identifiable information 202 from the shareable device 102, and maintain the information as the user identifiable information 216 in the data storage 206 for subsequent reference. In implementations, the server computing device 204 may also maintain the user access history 218 that correlates with the user identifiable information 216 associated with dates and times that various users have claimed use of the shareable device 102.

At 810, a current location of the shareable device is communicated to the additional device. For example, the device sharing module 112 implemented by the shareable device 102 initiates to communicate the shareable device location 220 to the server computing device 204 to identify a current location of the shareable device. Generally, the shareable device location 220 corresponds to the current location of the shareable device 102, or corresponds to the last known location of the shareable device, and may be maintained in the data storage 206 of the server computing device. Thus, if the shareable device 102 is lost or stolen, the owner of the shareable device may reference the shareable device location 220 to determine where to find the shareable device, or at least where to start looking for the device.

At 812, a disable command is received from the additional device that displays a user interface control selectable to initiate disabling the interactive session on the shareable device. For example, the device sharing module 112 implemented by the shareable device 102 receives the disable command 230 communicated from the server computing device 204 (e.g., as the control device) to the shareable device to disable the interactive session on the shareable device. The user interface control 228 displayed on the display screen 224 of the server computing device 204 is user selectable to disable the shareable device 102 by initiating the disable command 230. Thus, if the shareable device 102 is lost or stolen, or detected as no longer being connected to the network access point 210 of the wireless network, the owner of the shareable device can use the disable command 230 to disable the interactive session on the shareable device.

At 814, an alarm command is received from the additional device that displays a user interface control selectable to initiate the shareable device emitting an audible alarm. For example, the device sharing module 112 implemented by the shareable device 102 receives the alarm command 226 communicated from the server computing device 204 (e.g., as the control device) to the shareable device 102, causing the shareable device to emit an audible alarm. The user interface control 228 can be displayed on the display screen 224 of the server computing device 204, and the user interface control 228 is user selectable to initiate the shareable device 102 emitting an audible alarm. Thus, if the shareable device 102 is lost or stolen, or detected as no longer being connected to the network access point 210 of the wireless network, the owner of the shareable device may use the alarm command 226 to assist in locating the shareable device.

At 816, the interactive session is ended, thereby enabling the shareable device for use by a subsequent user. For example, the device sharing module 112 implemented by the shareable device 102 can end the interactive session 114 of the user, thereby enabling the shareable device 102 for use by a subsequent user. The device sharing module 112 may end the interactive session 114 of the user by receiving an indication of user intent to no longer use the shareable device. The device sharing module 112 may also end the interactive session 114 of the user responsive to determining that a predefined time limit associated with the interactive session has expired, if the interactive session 114 is constrained to a maximum time limit for a particular user. In other implementations, the device sharing module 208 of the server computing device 204 may also be implemented to initiate ending the interactive session 114 on the shareable device 102 automatically in response to detecting that the shareable device is no longer connected to the network access point 210 of the local area network.

At 818, the user is billed based on the time duration of the interactive session. For example, the device sharing module 112 implemented by the shareable device 102 can initiate billing the user based on the time duration of the interactive session 114 associated with the user who is using the shareable device, and using the billing information received as part of the user identifiable information 202.

Figure 9:
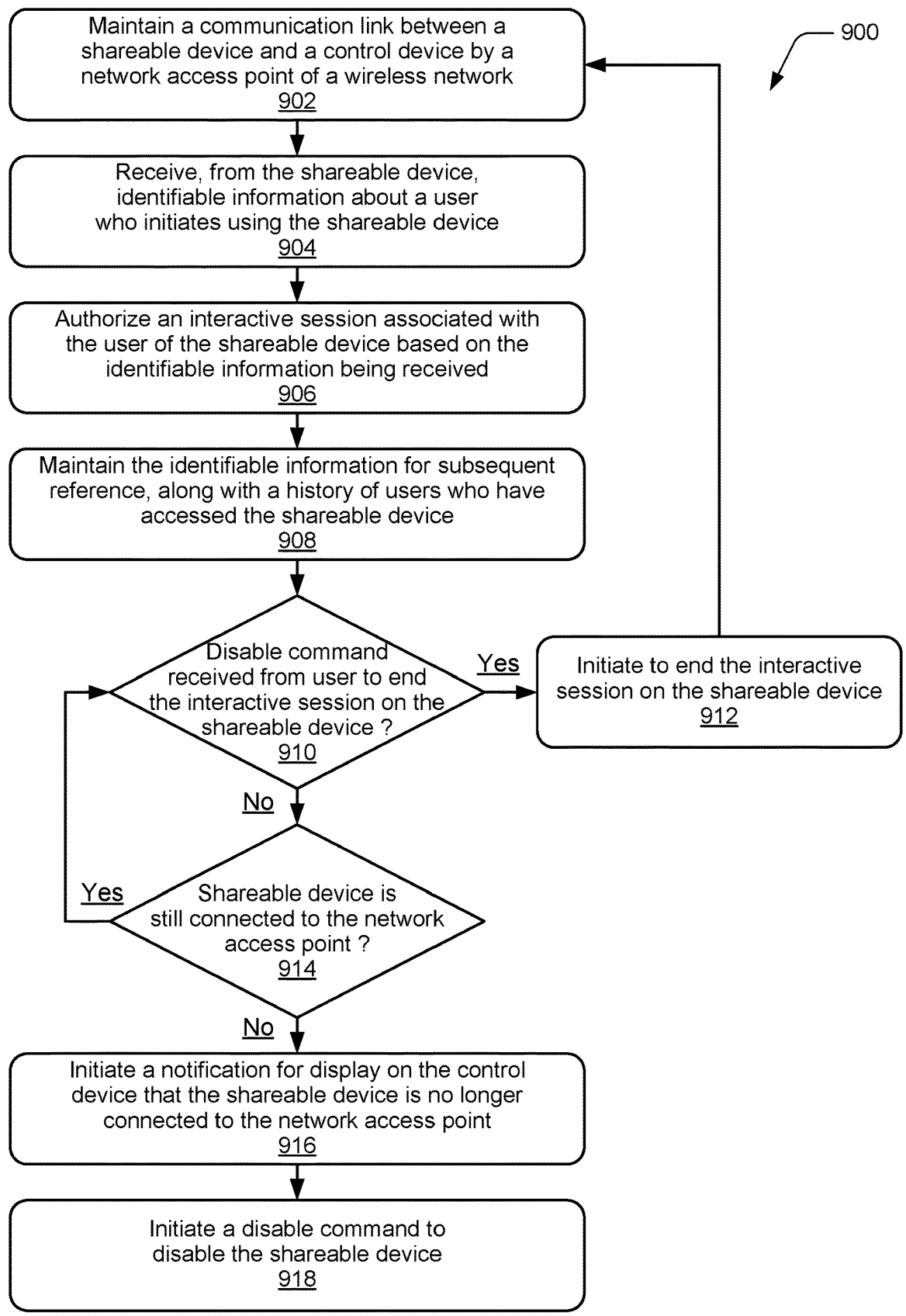

FIG. 9 illustrates example method(s) 900 of shareable devices, and is generally described with reference to a device sharing module implemented by a control device. The order in which the method is described is not intended to be construed as a limitation, and any number or combination of the described method operations can be performed in any order to perform a method, or an alternate method.

At 902, a communication link between a shareable device and a control device is maintained by a network access point of a wireless network. For example, the server computing device 204 is a control device that can control aspects of sharing the shareable device 102 (e.g., the mobile phone 110) in the various shared context 116 of the device. The access point 210 wirelessly connects the server computing device 204 and the shareable device 102 for network communication, such as in a local area network. Generally, the access point 210 may be part of the network 136 that facilitates data communications between the devices.

At 904, identifiable information about a user who initiates using a shareable device is received from the shareable device. For example, the device sharing module 208 implemented by the server computing device 204 can receive the user identifiable information 202 from the shareable device 102, and the information is maintained as the user identifiable information 216 in the data storage 206 for subsequent reference. The user identifiable information 216 may be an image of the user, a video clip of the user, user credentials associated with a wearable device of the user, a credit card scan, a driver's license scan, and/or any other kind of information that is usable to identify the user.

At 906, an interactive session associated with the user of the shareable device is authorized responsive to the identifiable information being received from the shareable device. For example, the device sharing module 208 implemented by the server computing device 204 can communicate the interactive session authorization 214 to the shareable device 102 responsive to receiving the user identifiable information 216 from the shareable device. The interactive session authorization 214 authorizes initiation of the interactive session 114 associated with the user of the shareable device 102.

At 908, the identifiable information is maintained for subsequent reference, along with a history of users who have accessed the shareable device. For example, the server computing device 204 can maintain the user identifiable information 216 in the data storage 206 of the server computing device 204 for subsequent reference. The server computing device 204 can also maintain the user access history 218 that correlates with the user identifiable information 216 associated with dates and times that various users have claimed use of the shareable device 102.

At 910, a determination is made as to whether a user selection of a disable command is received from a user interface control of the control device to end the interactive session on the shareable device. For example, the device sharing module 208 implemented by the server computing device 204 can receive a user selected disable command to initiate disabling the interactive session 114 on the shareable device 102. The user interface control 228 displayed on the display screen 224 of the server computing device 204 is user selectable to disable the shareable device 102 by initiating the disable command 230.

If a disable command has been received as a user selected input to end the interactive session on the shareable device (i.e., "Yes" from 910), then at 912, the interactive session on the shareable device is ended. For example, the device sharing module 208 implemented by the server computing device 204 can initiate communicating the disable command 230 to the shareable device 102. The device sharing module 112 implemented by the shareable device 102 can receive the disable command 230 and end the interactive session 114 on the shareable device. The disable command 230 can be initiated to disable and end the interactive session 114 on the shareable device, regardless of whether the interactive session 114 is currently active on the shareable device. The method continues at 902 with the network access point maintaining the communication link between the shareable device 102 and the server computing device 204 (e.g., the control device) for network communication.

If a disable command has not been received as a user selected input to end the interactive session on the shareable device (i.e., "No" from 910), then at 914, a determination is made as to whether the shareable device is still connected to the network access point of the wireless network. For example, the device sharing module 208 implemented by the server computing device 204 can determine whether the shareable device is still connected to the network access point 210 of the wireless network. If the shareable device is connected to the network access point of the wireless network (i.e., "Yes" from 914), then the method continues at 910 to determine whether a user selection of a disable command is received to disable the interactive session 114 on the shareable device 102.

If the shareable device is not still connected to the network access point of the wireless network (i.e., "No" from 914), then at 916, a notification is initiated for display on the control device that the shareable device is no longer connected to the network access point of the wireless network. For example, the device sharing module 208 implemented by the server computing device 204 can initiate to display the notification 222 on the display screen 224 of the server computing device 204 (e.g., the control device) in response to detecting that the shareable device 102 is no longer connected to the network access point 210 of the local area network.

At 918, a disable command is initiated to disable the shareable device responsive to detecting that the shareable device is no longer connected to the network access point of the wireless network. For example, the device sharing module 208 implemented by the server computing device 204 can initiate and automatically communicate the disable command 230 to the shareable device 102 responsive to detecting that the shareable device is no longer connected to the network access point 210 of the local area network.

Figure 10:
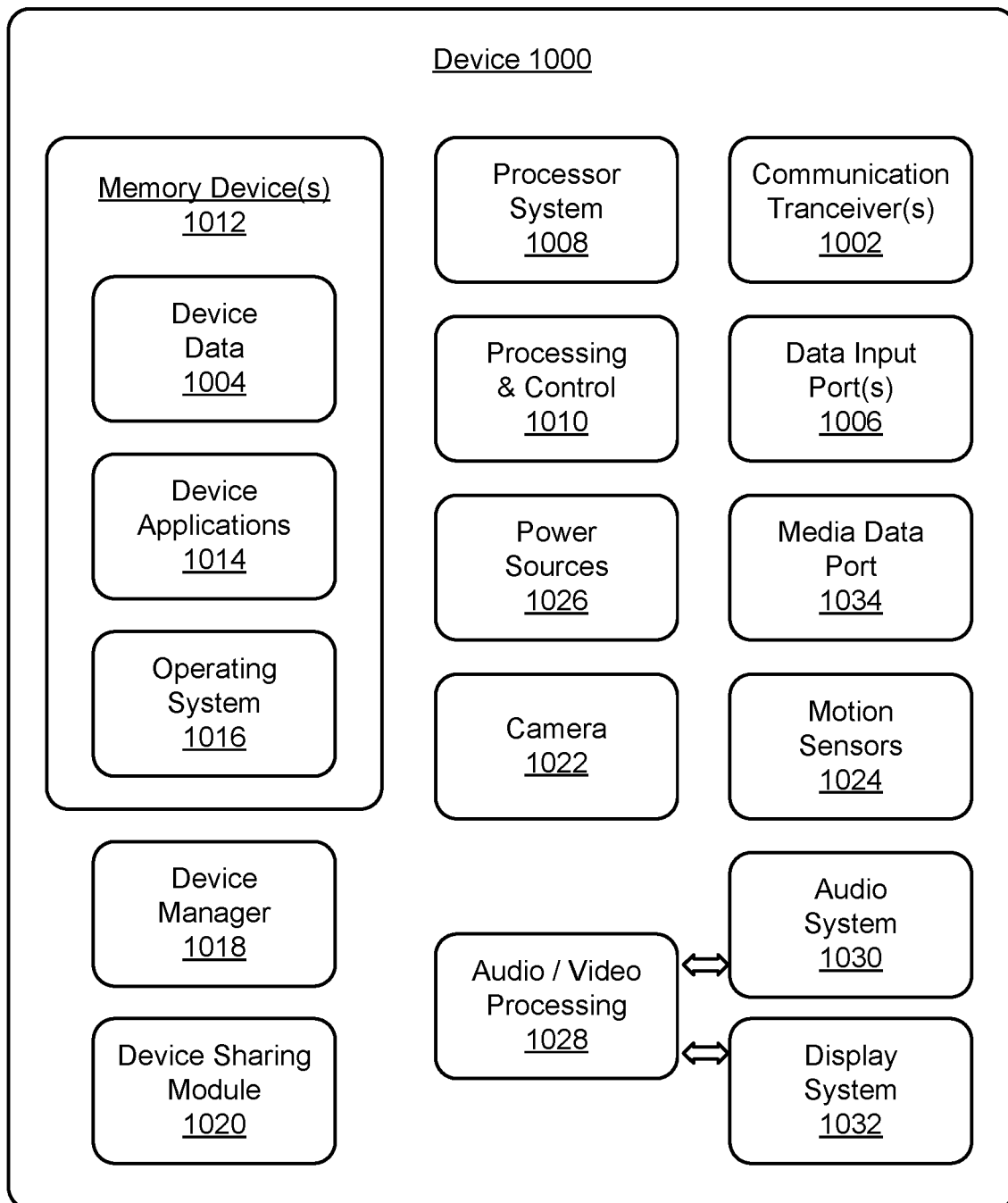
FIG. 10 illustrates various components of an example device that can used to implement the techniques of the shareable devices as described herein.

FIG. 10 illustrates various components of an example device 1000, in which aspects of the shareable devices can be implemented. The example device 1000 can be implemented as any of the devices described with reference to the previous FIGS. 1-9, such as any type of a mobile device, mobile phone, flip phone, client device, companion device, paired device, display device, tablet, computing, communication, entertainment, gaming, media playback, and/or any other type of computing and/or electronic device. For example, the shareable device 102, the mobile phone 110, the server computing device 204, and the additional device 306 described with reference to respective FIGS. 1-3 may be implemented as the example device 1000.

The device 1000 includes communication transceivers 1002 that enable wired and/or wireless communication of device data 1004 with other devices. The device data 1004 can include any of the various devices and device sharing module generated, stored, and/or determined data. Additionally, the device data 1004 can include any type of audio, video, and/or image data. Example communication transceivers 1002 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processor system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processor system 1008. The device applications may also include a device manager 1018, such as any form of a control application, software application, signal-processing and control module, code that is native to a particular device, a hardware abstraction layer for a particular device, and so on.

In this example, the device 1000 includes a device sharing module 1020 that implements aspects of shareable devices, as described herein. The device sharing module 1020 may be implemented with hardware components and/or in software as one of the device applications 1014, such as when the device 1000 is implemented as the shareable device 102 described with reference to FIGS. 1 and 2, or as the server computing device 204 described with reference to FIG. 2. Examples of the device sharing module 1020 include the device sharing module 112 that is implemented by the shareable device 102 and the device sharing module 208 that is implemented by the server computing device 204, such as a software application and/or as hardware components in the shareable device and/or in the server computing device. In implementations, the device sharing module 1020 may include independent processing, memory, and logic components as a computing and/or electronic device integrated with the example device 1000.

In this example, the device 1000 also includes a camera 1022 and motion sensors 1024, such as may be implemented as components of an inertial measurement unit (IMU). The motion sensors 1024 can be implemented with various sensors, such as a gyroscope, an accelerometer, and/or other types of motion sensors to sense motion of the device. The motion sensors 1024 can generate sensor data vectors having three-dimensional parameters (e.g., rotational vectors in x, y, and z-axis coordinates) indicating location, position, acceleration, rotational speed, and/or orientation of the device. The device 1000 can also include one or more power sources 1026, such as when the device is implemented as a mobile device. The power sources may include a charging and/or power system, and can be implemented as a flexible strip battery, a rechargeable battery, a charged super-capacitor, and/or any other type of active or passive power source.

The device 1000 can also include an audio and/or video processing system 1028 that generates audio data for an audio system 1030 and/or generates display data for a display system 1032. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1034. In implementations, the audio system and/or the display system are integrated components of the example device. Alternatively, the audio system and/or the display system are external, peripheral components to the example device.

Although implementations of shareable devices have been described in language specific to features and/or methods, the subject of the appended claims is not necessarily limited to the specific features or methods described. Rather, the specific features and methods are disclosed as example implementations of shareable devices, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: recognizing that a user intends to claim a shareable device for temporary use; authenticating the user to the shareable device to enable claiming of the shareable device, the authentication being performed without requiring user input; obtaining personalized content associated with the user for use on the shareable device which has been claimed by the user; and establishing an interactive session enabling the user to access the personalized content through applications and services available on the shareable device.

Alternatively or in addition to the above described method, any one or combination of: obtaining the personalized content includes: loading SIM information of the user to enable network data communications personal to the user via the shareable device; and accessing network-based accounts using an identity of the user. The recognizing that the user intends to claim the shareable device is based on the user being detected within a distance threshold proximate the shareable device. The recognizing that the user intends to claim the shareable device is based on detecting a user input as one of a gesture input or an audible input. Further, determining the shareable device is available for use in one of a private shared context or a public shared context, wherein the shareable device is claimed automatically in the private shared context and the shareable device is claimed with intentional user action in the public shared context; and obtaining the personalized content associated with the user based at least in part on the determination of shared context for using the shareable device. The authenticating the user to the shareable device is performed using existing account credentials associated with an identity of the user. The interactive session exposes the personalized content and notifications that are associated exclusively with the user. The establishing the interactive session on the shareable device includes requesting login credentials from the user prior to the user gaining access to the personalized content. Further, prompting the user to confirm claiming the shareable device in response to recognizing that the user intends to claim the shareable device.

A shareable device, comprising: a communication interface configured to receive personalized content associated with a user; and a device sharing module implemented at least partially in computer hardware to: recognize that the user intends to claim the shareable device for temporary use; authenticate the user to the shareable device to enable claiming of the shareable device, the authentication being performed without requiring user input; obtain the personalized content associated with the user for use on the shareable device which has been claimed by the user; and establish an interactive session enabling the user to access the personalized content through applications and services available on the shareable device.

Alternatively or in addition to the above described shareable device, any one or combination of: the device sharing module is implemented to: load SIM information of the user to enable network data communications personal to the user via the shareable device; and access network-based accounts using an identity of the user. The device sharing module is implemented to: determine the shareable device is available for use in one of a private shared context or a public shared context, wherein the shareable device is claimed automatically in the private shared context and the shareable device is claimed with intentional user action in the public shared context; and obtain the personalized content associated with the user based at least in part on the determination of shared context for using the shareable device. The device sharing module is implemented to prompt the user to confirm claiming the shareable device in response to recognition that the user intends to claim the shareable device.

A method, comprising: determining that multiple users are present within a distance threshold of a shareable device; identifying a user of the multiple users who intends to claim the shareable device for temporary use; authenticating the identified user to the shareable device to enable claiming of the shareable device, the authentication being performed without requiring user input; obtaining personalized content associated with the identified user for use on the shareable device which has been claimed by the identified user; and establishing an interactive session enabling the identified user to access the personalized content through applications and services available on the shareable device.

Alternatively or in addition to the above described method, any one or combination of: determining that only the identified user of the multiple users is present within a distance threshold proximate the shareable device; and enabling automatic claiming of the shareable device by the identified user responsive to the determination that only the identified user is present within the distance threshold. The obtaining the personalized content associated with the identified user includes: loading SIM information of the identified user to enable network data communications personal to the identified user via the shareable device; and accessing network-based accounts using an identity of the identified user. The identifying the user of the multiple users who intends to claim the shareable device is identified based on respective distances of the multiple users from the shareable device. The identifying the user of the multiple users who intends to claim the shareable device is identified based on a user input as one of a gesture input or an audible input. Further, determining the shareable device is available for use in one of a private shared context or a public shared context, wherein the shareable device is claimed automatically in the private shared context and the shareable device is claimed with intentional user action in the public shared context; and obtaining the personalized content associated with the identified user based at least in part on the determination of the private shared context or the public shared context for using the shareable device. The establishing the interactive session on the shareable device includes requesting login credentials from the identified user prior to the identified user gaining access to the personalized content.

The invention claimed is:

1. A method, comprising:
  establishing a first interactive session associated with a first user on a shareable device, the first interactive session enabling the first user to access personalized content accessible exclusively by the first user;
  recognizing, by the shareable device, that the first user intends to end the first interactive session and that a second user intends to claim the shareable device for temporary use;
  determining the shareable device is available for use in a shared context, the shareable device being available to a designated group of individuals in a private shared context and the shareable device being available to the general public in a public shared context, the shareable device being claimed automatically in the private shared context and the shareable device being claimed with intentional user action in the public shared context;
  excluding the second user from access to the personalized content that is accessible exclusively by the first user;
  authenticating the second user to the shareable device to enable claiming of the shareable device, the authentication being performed without requiring user input;
  obtaining personalized content accessible exclusively by the second user for use on the shareable device which has been claimed by the second user, the personalized content accessible exclusively by the second user based at least in part on a determination of the shared context for using the shareable device; and establishing a second interactive session enabling the second user to access the personalized content accessible exclusively by the second user through applications and services available on the shareable device.

2. The method as recited in claim 1, wherein obtaining the personalized content accessible exclusively by the second user includes:
   loading subscriber identity module information of the second user to enable network data communications personal to the second user via the shareable device; and
   accessing network-based accounts using an identity of the second user.

3. The method as recited in claim 1, wherein recognizing that the second user intends to claim the shareable device is based on the second user being detected within a distance threshold proximate the shareable device.

4. The method as recited in claim 1, wherein recognizing that the second user intends to claim the shareable device is based on detecting a user input as one of a gesture input or an audible input.

5. The method as recited in claim 1, wherein authenticating the second user to the shareable device is performed using existing account credentials associated with an identity of the second user.

6. The method as recited in claim 1, wherein the personalized content accessible exclusively by the second user includes notifications that are exclusively unique to the second user.

7. The method as recited in claim 1, wherein establishing the second interactive session on the shareable device includes requesting login credentials from the second user prior to the second user gaining access to the personalized content accessible exclusively by the second user.

8. The method as recited in claim 1, further comprising:
   detecting that the second user has moved away from the shareable device; and
   obscuring the personalized content accessible exclusively by the second user, while maintaining the second interactive session on the shareable device.

9. The method as recited in claim 8, further comprising:
   detecting that the second user is within a distance threshold proximate the shareable device; and
   exposing the obscured personalized content accessible exclusively by the second user.

10. A shareable device, comprising:
    a communication interface configured to receive personalized content accessible exclusively by a first user; and
    a device sharing module implemented at least partially in computer hardware including a processor executable to:
    establish a first interactive session associated with the first user on the shareable device, the first interactive session enabling the first user to access the personalized content that is accessible exclusively by the first user;
    recognize that the first user intends to end the first interactive session and that a second user intends to claim the shareable device for temporary use;
    determine the shareable device is available for use in a shared context, the shareable device being available to a specific group of individuals in a private shared context and the shareable device being available to the general public in a public shared context, the shareable device claimed automatically in the private shared context and the shareable device claimed with intentional user action in the public shared context;
    exclude the second user from access to the personalized content that is accessible exclusively by the first user;
    authenticate the second user to the shareable device to enable claiming of the shareable device, the authentication being performed without requiring user input;
    obtain personalized content accessible exclusively by the second user for use on the shareable device which has been claimed by the second user, the personalized content accessible exclusively by the second user based at least in part on the determination of the shared context for using the shareable device; and
    establish an interactive session enabling the second user to access the personalized content accessible exclusively by the second user through applications and services available on the shareable device.

11. The shareable device as recited in claim 10, wherein the device sharing module is implemented to:
    load subscriber identity module information of the second user to enable network data communications personal to the second user via the shareable device; and
    access network-based accounts using an identity of the second user.

12. The shareable device as recited in claim 10, wherein the device sharing module is implemented to prompt the second user to confirm claiming the shareable device in response to recognition that the second user intends to claim the shareable device.

13. The shareable device as recited in claim 10, wherein the device sharing module is implemented to:
    detect that the second user has moved away from the shareable device; and
    obscure the personalized content accessible exclusively by the second user, while maintaining the second interactive session on the shareable device.

14. The shareable device as recited in claim 13, wherein the device sharing module is implemented to:
    detect that the second user is within a distance threshold proximate the shareable device; and
    expose the obscured personalized content accessible exclusively by the second user.

15. A method, comprising:
    establishing a first interactive session associated with a first user on a shareable device, the first interactive session enabling the first user to access personalized content accessible exclusively by the first user;
    determining that multiple additional users are present within a distance threshold of the shareable device;
    determining the shareable device is available for use in a shared context, the shareable device being available to a designated group of individuals in a private shared context and the shareable device being available to the general public in a public shared context, the shareable device being claimed automatically in the private shared context and the shareable device being claimed with intentional user action in the public shared context;
    identifying a second user of the multiple additional users who intends to claim the shareable device for temporary use, the identifying the second user based on recognizing that the first user intends to end the first interactive session;
    excluding the second user from access to the personalized content that is accessible exclusively by the first user;
    authenticating the second user to the shareable device to enable claiming of the shareable device, the authentication being performed without requiring user input;

obtaining personalized content accessible exclusively by the second user for use on the shareable device which has been claimed by the second user, the personalized content accessible exclusively by the second user obtained based at least in part on the determination of the shared context for using the shareable device; and establishing a second interactive session enabling the second user to access the personalized content accessible exclusively by the second user through applications and services available on the shareable device.

16. The method as recited in claim 15, further comprising:

determining that only the second user of the multiple additional users is present within a distance threshold proximate the shareable device; and enabling automatic claiming of the shareable device by the second user responsive to the determination that only the second user is present within the distance threshold.

17. The method as recited in claim 15, wherein obtaining the personalized content accessible exclusively by the second user includes:

loading subscriber identity module information of the second user to enable network data communications personal to the second user via the shareable device; and accessing network-based accounts using an identity of the second user.

18. The method as recited in claim 15, wherein the identifying the second user of the multiple additional users who intends to claim the shareable device is identified based on respective distances of the multiple additional users from the shareable device.

19. The method as recited in claim 15, wherein the identifying the second user of the multiple additional users who intends to claim the shareable device is identified based on a user input as one of a gesture input or an audible input.

20. The method as recited in claim 15, further comprising:

detecting that the second user has moved away from the shareable device; and obscuring the personalized content accessible exclusively by the second user, while maintaining the second interactive session on the shareable device.

\* \* \* \* \*